(12) United States Patent
Otsuka et al.

(10) Patent No.: US 7,119,895 B2
(45) Date of Patent: Oct. 10, 2006

(54) METHOD OF AND APPARATUS FOR ADJUSTING OPTICAL COMPONENT, AND OPTICAL UNIT

(75) Inventors: Keiji Otsuka, Utsunomiya (JP); Hirofumi Morita, Shiki (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 364 days.

(21) Appl. No.: 10/432,990

(22) PCT Filed: Nov. 22, 2001

(86) PCT No.: PCT/JP01/10201

§ 371 (c)(1),
(2), (4) Date: May 28, 2003

(87) PCT Pub. No.: WO02/44785

PCT Pub. Date: Jun. 6, 2002

(65) Prior Publication Data

US 2004/0027562 A1     Feb. 12, 2004

(30) Foreign Application Priority Data

| Nov. 28, 2000 | (JP) | ............................. 2000-361792 |
| Nov. 28, 2000 | (JP) | ............................. 2000-361804 |
| Nov. 28, 2000 | (JP) | ............................. 2000-361808 |
| Nov. 28, 2000 | (JP) | ............................. 2000-361813 |
| Nov. 28, 2000 | (JP) | ............................. 2000-361819 |

(51) Int. Cl.
    *G01B 11/26* (2006.01)
(52) U.S. Cl. .................................. 356/139.4; 356/154
(58) Field of Classification Search ... 356/138–139.08, 356/139.09–141.3, 154, 399, 400; 359/819, 359/882; 372/9, 107
See application file for complete search history.

(56) References Cited

U.S. PATENT DOCUMENTS

| 4,655,548 | A |   | 4/1987 | Jue |
| 5,353,167 | A |   | 10/1994 | Kuklo et al. |
| 5,648,847 | A |   | 7/1997 | Ebbing |
| 5,742,383 | A |   | 4/1998 | Jeon |
| 6,086,209 | A | * | 7/2000 | Miyahara et al. ........... 359/872 |

FOREIGN PATENT DOCUMENTS

| DE | 43 22 609 A1 | 1/1995 |
| EP | 0 943 948 A1 | 9/1999 |
| EP | 1 026 538 A2 | 8/2000 |
| JP | 63-86609 U | 6/1988 |
| JP | 63-126854 U | 8/1988 |
| JP | 63-229412 A | 9/1988 |
| JP | 1-117610 U | 8/1989 |

(Continued)

OTHER PUBLICATIONS

Patent Abstracts of Japan. vol. 016, No. 075 (P-1316), Feb. 24, 1992 & JP 03 264836 A. Nov. 26, 1991.

(Continued)

*Primary Examiner*—Layla G. Lauchman
(74) *Attorney, Agent, or Firm*—Birch, Stewart, Kolasch & Birch, LLP

(57) ABSTRACT

An apparatus for adjusting an optical component has a reference beam unit for emitting a reference laser beam L whose optical axis has established, and an optical axis unit detecting the optical axis and focal point of a reflected beam La from a parabolic mirror to which the reference laser beam L is applied. The optical axis unit comprises first and second pinhole plates spaced a given distance from each other and having respective small holes defined therein.

33 Claims, 32 Drawing Sheets

FOREIGN PATENT DOCUMENTS

| | | |
|---|---|---|
| JP | 1-229216 A | 9/1989 |
| JP | 02-089662 A | 3/1990 |
| JP | 2-91939 U | 7/1990 |
| JP | 03-073914 A | 3/1991 |
| JP | 4-6007 U | 1/1992 |
| JP | 4-248505 A | 9/1992 |
| JP | 5-157947 A | 6/1993 |
| JP | 9-21613 A | 1/1997 |
| JP | 10-111217 A | 4/1998 |
| JP | 11-038736 A | 2/1999 |
| JP | 11-058827 A | 3/1999 |
| JP | 11-215060 * | 8/1999 |
| JP | 2000-162484 A | 6/2000 |
| JP | 2000-321165 A | 11/2000 |

OTHER PUBLICATIONS

Seward G H., et al. Optical Engineering, Soc. of Photo-Optical Instrumentation Engineers. vol. 36, No. 5, pp. 1414-1420, May 1, 1997.

Patent Abstracts of Japan. vol. 015, No. 287 (P-1229), Jul. 22, 1991 & JP 03 098013 A. Apr. 23, 1991.

Patent Abstracts of Japan. vol. 1996, No. 10, Oct. 31, 1996 & JP 08 154155 A. Jun. 11, 1996.

* cited by examiner

METHOD OF AND APPARATUS FOR ADJUSTING OPTICAL COMPONENT, AND OPTICAL UNIT

This application is the national phase under 35 U.S.C. § 371 of PCT International Application No. PCT/JP01/10201 which has an International filing date of Nov. 22, 2001, which designated the United States of America.

TECHNICAL FIELD

The present invention relates to a method of and an apparatus for adjusting an optical component of a laser optical instrument, and an optical unit.

BACKGROUND ART

Laser optical instruments employing a laser beam include a laser beam machining device, a laser beam measuring device, etc., for example. Such laser optical instruments incorporate various optical components such as lenses, reflecting mirrors, etc. for guiding a laser beam to a predetermined applying position. Reflecting mirrors are available in various types including a plane mirror, a parabolic mirror, and an elliptical mirror.

When assembling laser optical instruments, therefore, it is desirable to make alignment adjustments accurately for layout adjustments, focal point measurements, etc. of various optical components in order to reliably perform high-quality laser machining processes and highly accurate laser measuring processes.

Generally, He—Ne laser is used to make such alignment adjustments. Specifically, a laser beam emitted from an He—Ne laser source is used as a reference beam for layout adjustments, focal point measurements, etc. of optical components. However, the laser beam emitted from an He—Ne laser source is problematic in that the absolute position of the laser beam cannot easily be obtained because there is no center (optical center) in the laser beam.

Laser beams do not have a definite configuration as they oscillate in longitudinal modes or transverse modes depending on the oscillator structure. Furthermore, a laser beam needs to be large in diameter in order to achieve desired parallelism between the laser beam and a mechanical axis. It has been pointed out that it is not possible to reliably obtain a sufficiently thin, parallel, and straight laser beam that is required as a reference beam.

In order to make accurate alignment adjustments of optical components, it is necessary to detect a sole accurate reflecting optical axis aligned with a mechanism axis. However, it is considerably difficult to accurately detect such a reflecting optical axis. As a result, it has been impossible to make highly accurate alignment adjustments of optical components.

It has been customary to measure the focal point of a focusing optical system such as a parabolic mirror, an elliptical mirror, or the like by actually applying reflected light from the focusing optical system to a wall or the like and directly observing how the applied light is focused.

However, the focal point of the focusing optical system varies depending on the parallelism of the light applied thereto, the layout of the focusing optical system, the surface accuracy thereof, and other elements, making it difficult to achieve a desired reproducibility of measurements. Consequently, the focal point of the focusing optical system cannot accurately be measured.

Laser optical instruments have a plurality of optical components mounted on an optical tabletop in alignment with the optical axis of a laser beam. Since it is difficult to make alignment adjustments of the optical components on the optical tabletop, the process of making alignment adjustments is highly complex and such alignment adjustments cannot be made with accuracy.

One solution is to make alignment adjustments of the optical components before the optical components are installed on the optical tabletop. However, even if the alignment adjustments of the optical components have been made accurately, the optical components may possibly be brought out of alignment with the optical axis due to assembling errors and mechanical errors. For this reason, highly accurate alignment adjustments of the optical components have not been possible in the art.

DISCLOSURE OF INVENTION

It is a major object of the present invention to provide a method of and apparatus for adjusting an optical component by using an ordinary laser beam which has been accurately center d as a reference laser beam to measure the optical component highly accurately and easily.

Another object of the present invention is to provide a method of and apparatus for adjusting an optical component by highly accurately detecting a reflecting optical axis with a simple arrangement to make alignment adjustments of the optical component efficiently and accurately.

Still another object of the present invention is to provide a method of and apparatus for adjusting an optical component so as to highly accurately detect the focal point of a focusing optical system with a simple process and arrangement.

Yet another object of the present invention is to provide a method of and apparatus for adjusting an optical component so as to make alignment adjustments of a non-plane mirror efficiently and accurately with a simple process and arrangement.

Yet still another object of the present invention is to provide an optical unit which is capable of making alignment adjustments of an optical component efficiently and accurately with a simple arrangement.

In a method of and an apparatus for adjusting an optical component according to an aspect of the present invention, when a laser beam unit of a reference beam unit which incorporates a laser oscillator is rotated about an optical axis with respect to a base by a rotating mechanism, a reference laser beam emitted from the laser oscillator is moved, rotating an optical image in a position to which the reference laser beam is applied. A beam center adjusting mechanism adjusts the attached state of the laser beam unit to bring the optical axis of the reference laser beam into conformity with the rotational center of the reference beam unit, which is aligned with the optical axis and the mechanical axis. It is thus possible to reliably obtain the reference laser beam which serves as a desired parallel, straight reference beam having a small beam diameter.

In a method of and an apparatus for adjusting an optical component according to another aspect of the present invention, a reference laser beam is applied to an optical component, and a reflected beam from the optical component is applied to an optical axis unit. The optical axis unit has first and second pinhole plates spaced a given distance from each other and having respective small holes defined therein. Only when the optical component is placed at a given angle in a given position, the reflected beam from the optical component passes through the small holes in the first and second pinhole plates and is detected at a measurand. Therefore, it is possible to position the optical component highly accurately.

Specifically, any deviation of the optical axis of the reflected beam which tends to occur when th reflected beam from the optical component is measured at a single measurement point is reliably detected, and the accuracy with which to position the optical component is greatly increased with a simple arrangement. The optical component may be a plane mirror or a non-plane mirror such as a parabolic mirror, an elliptical mirror, or the like.

In a method of and an apparatus for adjusting an optical component according to still another aspect of the present invention, a reference beam unit for emitting a reference laser beam whose optical axis has been established is translated or tilted with respect to the optical axis, and applies the reference laser beam to a non-plane mirror as the optical component.

A reflected beam from the non-plane mirror which is irradiated with the reference laser beam is applied to an optical axis detecting unit, which is moved along the optical axis of the reference laser beam. A position where the movement of the optical axis (beam dot) of the reflected beam detected by the optical axis detecting unit is minimum is established as the focal point of the non-plane mirror. The focal point of the non-plane mirror is thus detected highly accurately and efficiently with a simple process and arrangement.

If the non-plane mirror is a parabolic mirror, while the reference beam unit is being translated (in parallel to the reference laser beam), the reference laser beam is emitted from the reference beam unit. The reference laser beam is reflected by the parabolic mirror and applied to the optical axis detecting unit, which is moved along the optical axis of the reference laser beam. A position in which the movement of the optical axis of the reflected beam detected by the optical axis detecting unit is established as the focal point of-the parabolic mirror.

If the non-plane mirror is an elliptical mirror, while the reference beam unit is being tilted, the reference laser beam is applied to the elliptical mirror, which applies a reflected beam to the optical axis detecting unit, which is moved along the optical axis. The movement of the optical axis of the reflected beam is detected by the optical axis detecting unit. A position where the detected movement is the minimum is used as the focal point of the elliptical mirror.

In a method of and an apparatus for adjusting an optical component according to yet another aspect of the present invention, a laser beam unit incorporating a laser oscillator is rotated about an optical axis to bring the optical axis of the reference laser beam emitted from the laser oscillator into conformity with the rotational center of the reference beam unit, which is aligned with the optical axis and the mechanical axis. The optical axis position of the reference laser beam is adjusted to obtain, highly accurately and reliably, the reference laser beam which serves as a desired reference beam.

Then, the reference laser beam whos optical axis has been established is applied to a non-plane mirror, and a reflected beam from the non-plane mirror is measured to detect the optical axis and/or angle of the non-plane mirror. Based on the detected optical axis and/or angle of the non-plane mirror, the position and/or angle of the non-plane mirror is adjusted. Thus, the non-plane mirror can be adjusted highly accurately and efficiently with a simple process and arrangement.

In an optical unit according to the present invention, an optical component is mounted by an adjusting mechanism on a base member that is detachably mounted on an optical tabletop. The base member is removed from the optical tabletop and placed in an adjusting facility. Then, alignment adjustments of the optical component are made using the adjusting mechanism. Thereafter, simply when the base member is installed back on the optical tabletop, alignment adjustments of the optical component are well performed with respect to the optical tabletop. In this manner, alignment adjustments of the optical component can be made highly accurately and efficiently with a simple arrangement.

The above and other objects, feature, and advantages of the present invention will become more apparent from the following description when taken in conjunction with the accompanying drawings in which preferred embodiments of the present invention are shown by way of illustrative example.

BEST MODE FOR CARRYING OUT THE INVENTION

Figure 1:
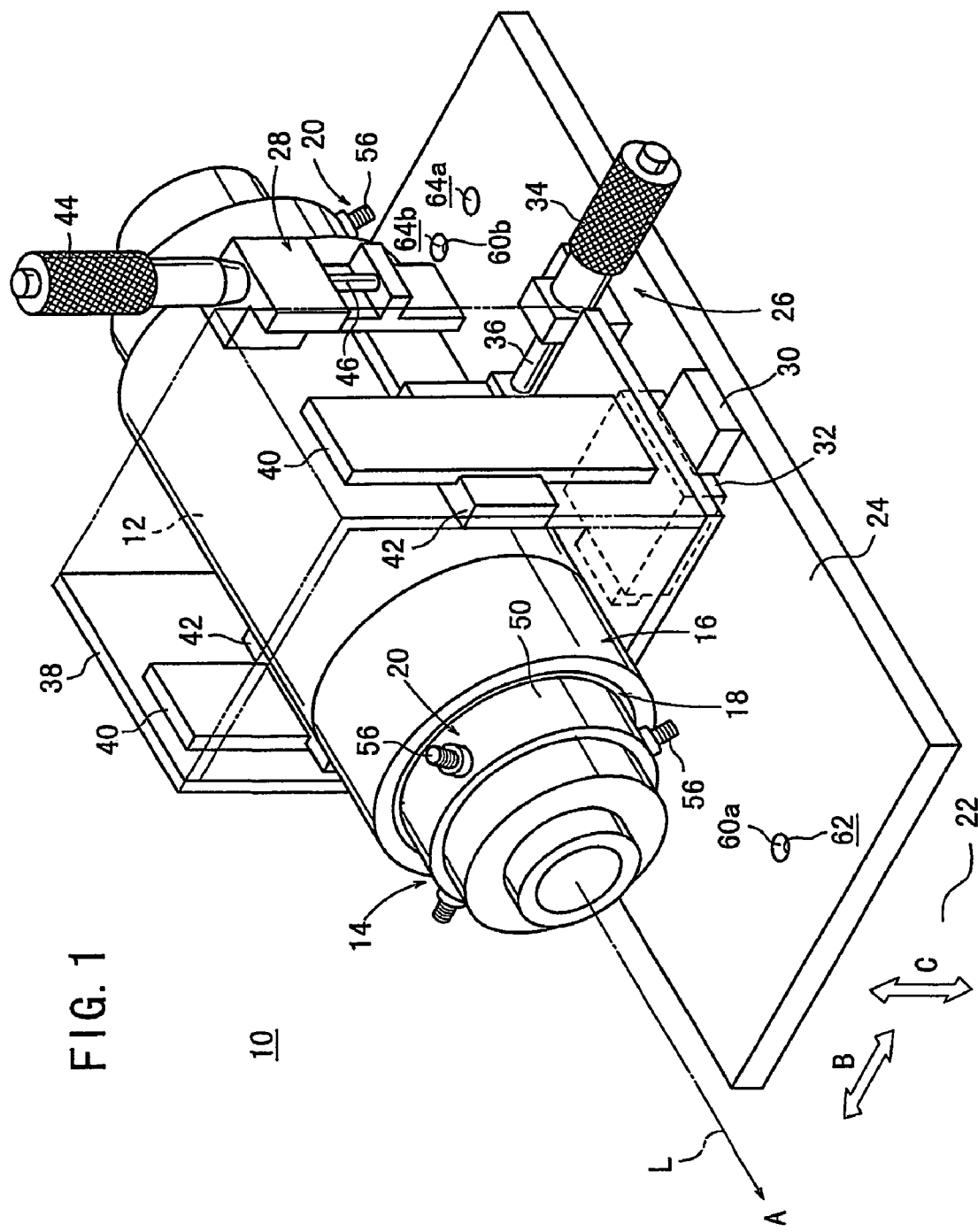
FIG. 1 is a perspective view of a reference beam unit of an apparatus for adjusting an optical component according to a first embodiment of the present invention.
Figure 2:
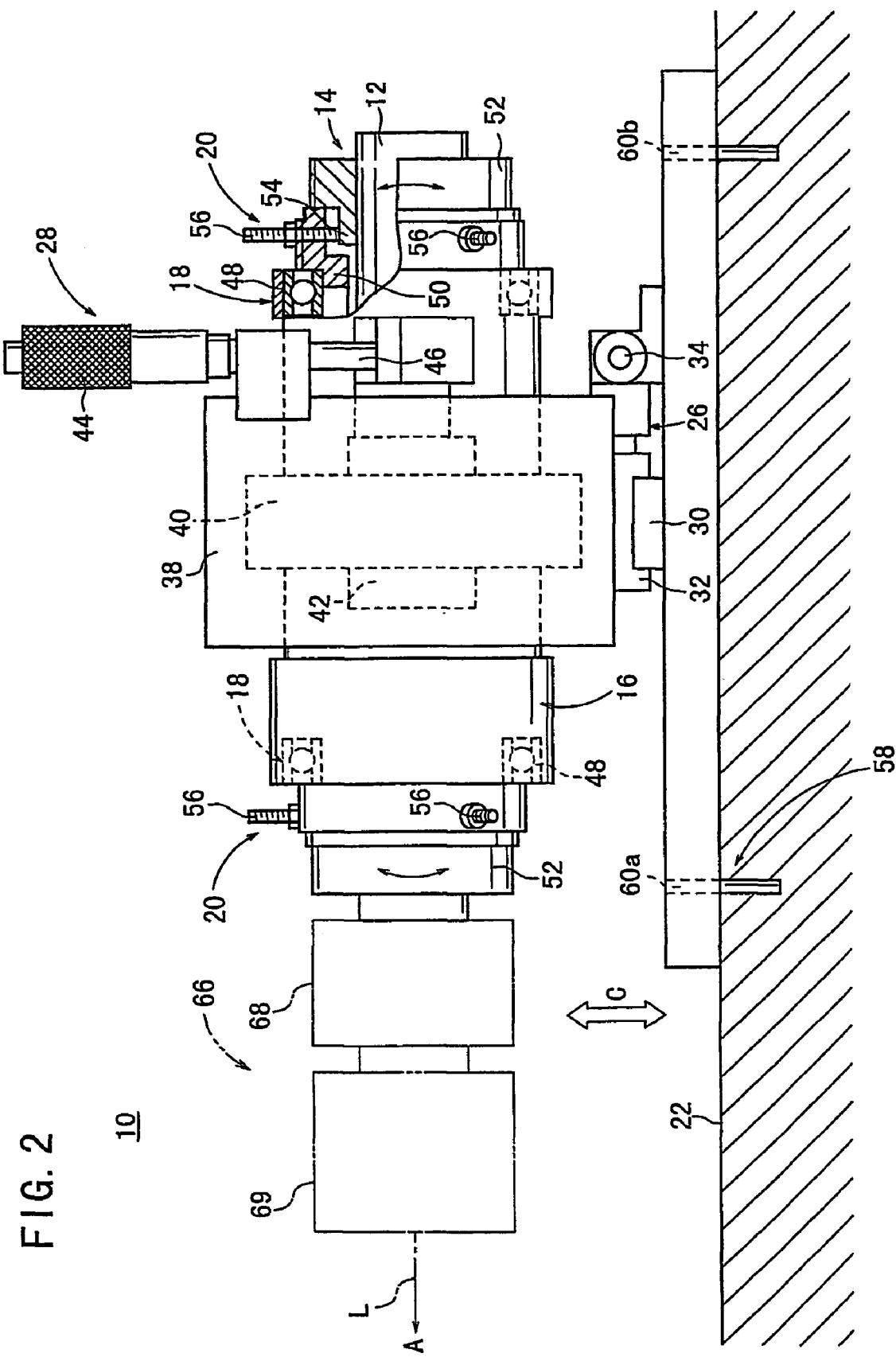
FIG. 2 is a side elevational view of the reference beam unit.
Figure 3:
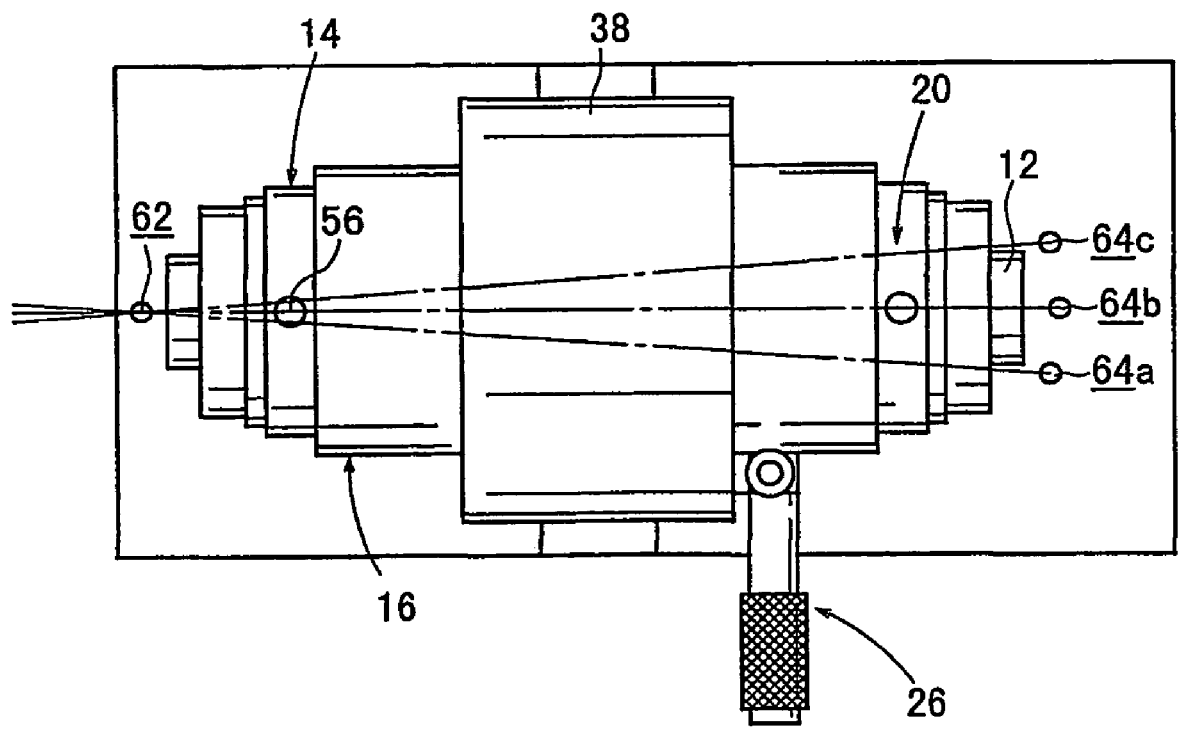
FIG. 3 is a plan view of the reference beam unit.

FIG. 1 shows in perspective a reference beam unit 10 of an apparatus for adjusting an optical component according to a first embodiment of the present invention. FIGS. 2 and 3 show the reference beam unit 10 respectively in side elevation and plan.

The reference beam unit 10 has a function to apply a reference laser beam L for use in measuring various optical components. The reference beam unit 10 generally comprises a laser beam unit 14 incorporating a laser oscillator 12 such as an He—Ne laser or the like for emitting the reference laser beam L, a rotating mechanism 18 for rotating the laser beam unit 14 about an optical axis with respect to a support barrel (base) 16, and a beam center adjusting mechanism 20 for aligning the optical axis of the reference laser beam L emitted from the laser beam unit 14 with the rotational center of the reference beam unit 10.

The reference beam unit 10 has a unit base 24 fixedly mounted on a measurement base 22. The support barrel 16 is mounted on the unit base 24 by a horizontal slide mechanism 26 and a vertical slide mechanism 28. The horizontal slide mechanism 26 has a guide rail 30 mounted on the unit base 24 and extending in the directions indicated by the arrow B which are perp ndicular to the optical axis, and a slide base 32 slidably mounted on the guide rail 30 for horizontal movement in the directions indicated by the arrow B. A first micrometer 34 which extends horizontally is fixedly mounted on the unit base 24 and has a rod 36 fixed to the slide base 32.

A hollow column 38 is mounted on the slide base 32, and the vertical slide mechanism 28 has a pair of horizontally spaced vertical guide rails 40 secured to respective inner surfaces of the column 38. Two guides 42 engaging the respective guide rails 40 for vertical movement therealong are mounted on respective opposite sides of the support barrel 16. A second micrometer 44 extending vertically downwardly is mounted on an upper side portion of an end of the column 38. The second micrometer 44 has a rod 44 projecting downwardly and fixed to the support barrel 16.

The rotating mechanism 18 has a pair of axially spaced bearings 48 by which a rotary tube 50 is mounted in the support barrel 16. The laser oscillator 12 is housed in the rotary tube 50. Holders 52 are mounted on the respective opposite ends of the laser oscillator 12 and have respective smaller-diameter portions 54 inserted in the rotary tube 50.

The beam center adjusting mechanism 20 has two sets of three adjustment screws 56 angularly spaced at equal angular intervals and threaded radially inwardly through the opposite ends of the rotary tube 50. The threaded adjustment screws 56 have radially inner tip ends held against the smaller-diameter portions of the holders 52 for tilting the optical axis of the laser oscillator 12.

As shown in FIGS. 2 and 3, the reference beam unit 10 has a tilting mechanism 58 for tilting the reference beam unit 10 in the directions (indicated by the arrow B) perpendicular to the optical axis (indicated by the arrow A). The tilting mechanism 58 has knock pins 60a, 60b mounted on the measurement base 22. The knock pin 60a is fitted in a hole 62 defined in the unit base 24 at its front end in the direction indicated by the arrow A. The knock pin 60b is selectively fitted in three holes 64a, 64b, 64c defined in the unit base 24 at its rear end in the direction indicated by the arrow A.

As shown in FIG. 2, a beam diameter increasing means 66 for increasing the beam diameter of the reference laser beam L is detachably mounted on the front end of the laser beam unit 14. The beam diameter increasing means 66 serves to convert the reference laser beam L having a beam diameter of 0.8 mm into a parallel beam (collimated beam) having a beam diameter of 25 mm. The beam diameter increasing means 66 comprises a filter unit 68 made up of many types of pinhole assemblies and focusing lenses and a lens unit 69 including a beam expander lens set.

Figure 4:
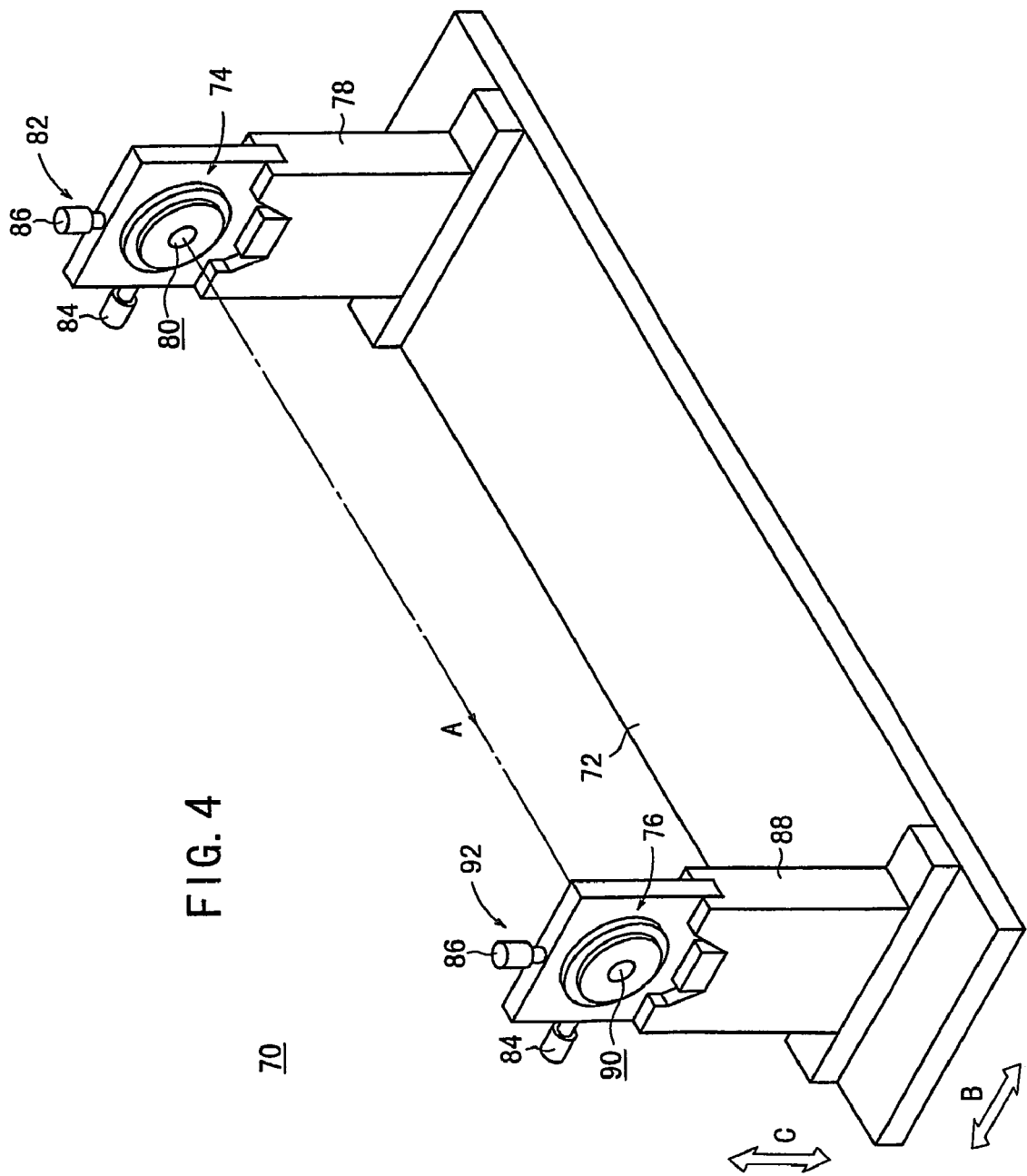
FIG. 4 is a perspective view of an optical axis unit of the adjusting apparatus according to the first embodiment.
Figure 5:
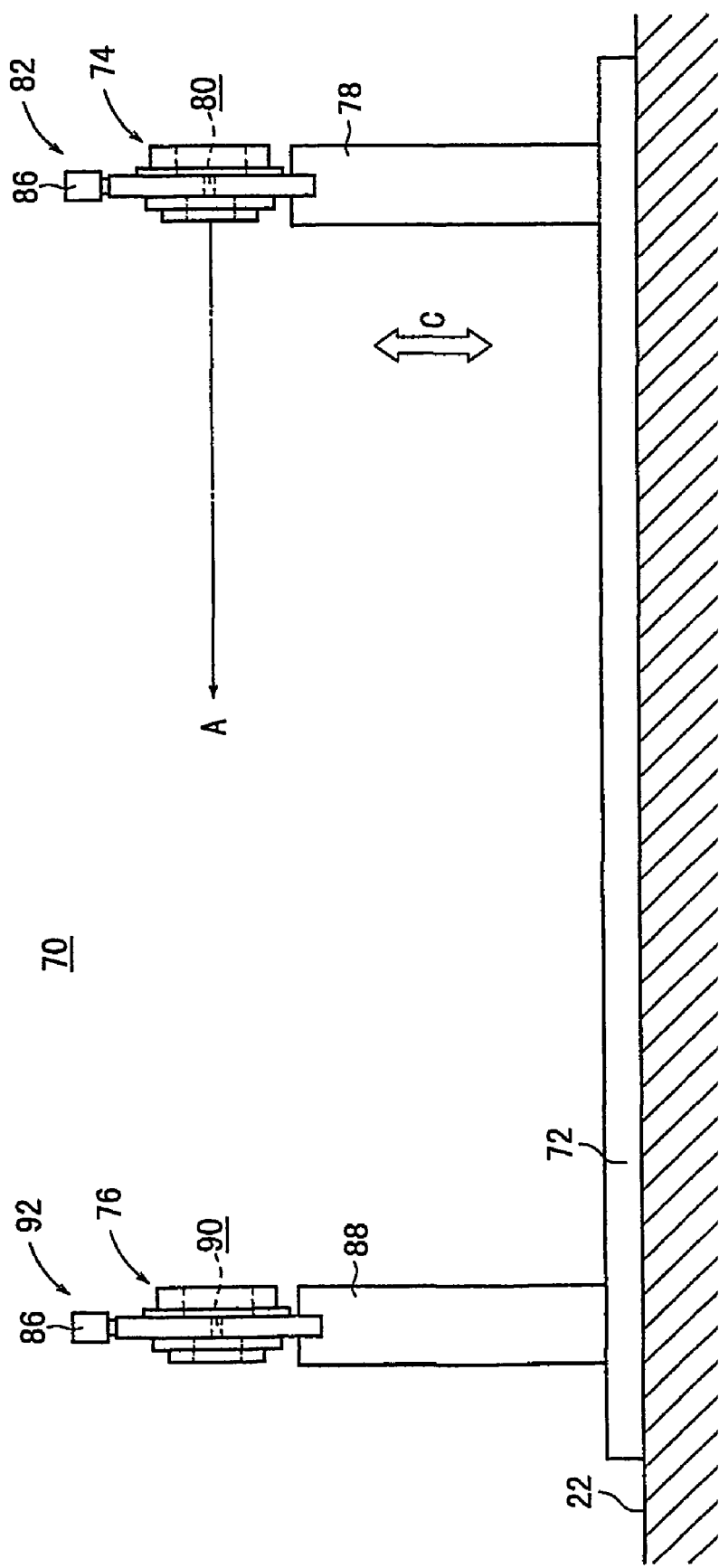
FIG. 5 is a side elevational view of the optical axis unit.

FIG. 4 shows in perspective an optical axis unit 70 of the adjusting apparatus according to the first embodiment, and FIG. 5 shows the optical axis unit 70 in side elevation.

As shown in FIGS. 4 and 5, the optical axis unit 70 has a unit base 72 fixedly mounted on the measurement base 22. First and second pinhole plates 74, 76 spac d from each other by a given distance are mounted on, the unit base 72. The first pinhole plate 74 is supported on a first support plate 78 that is fixedly mounted on the unit base 72. The first pinhole plate 74 has a first small hole 80 defined centrally therein and having a predetermined diameter.

The first pinhole plate 74 has a first small hole position adjusting mechanism 82 for positionally adjusting the first small hole 80 in horizontal directions (indicated by the arrow B) and vertical directions (indicated by the arrow C), both extending perpendicularly to the optical axis (indicated by the arrow A). The first small hole position adjusting mechanism 82 comprises a first adjustment screw 84 extending horizontally for moving the first pinhole plate 74 horizontally and a second adjustment screw 86 extending vertically for moving the first pinhole plate 74 vertically.

The second pinhole plate 76 is supported on a second support plate 88 that is fixedly mounted on the unit base 72. The second pinhole plate 76 has a second small hole 90 defined centrally therein and having a predetermined diameter. The second pinhole plate 76 has a second small hole position adjusting mechanism 92 for positionally adjusting the second small hole 90 in horizontal directions (indicated by the arrow B) and vertical directions (indicated by the arrow C), both extending perpendicularly to the optical axis (indicated by the arrow A). The second small hole position adjusting mechanism 92 is identical in structure to the first small hole position adjusting mechanism 82. Those parts of the second hole position adjusting mechanism 92 which are identical to those of the first-small hole position adjusting mechanism 82 are denoted by identical reference numerals, and will not be described below.

Figure 6:
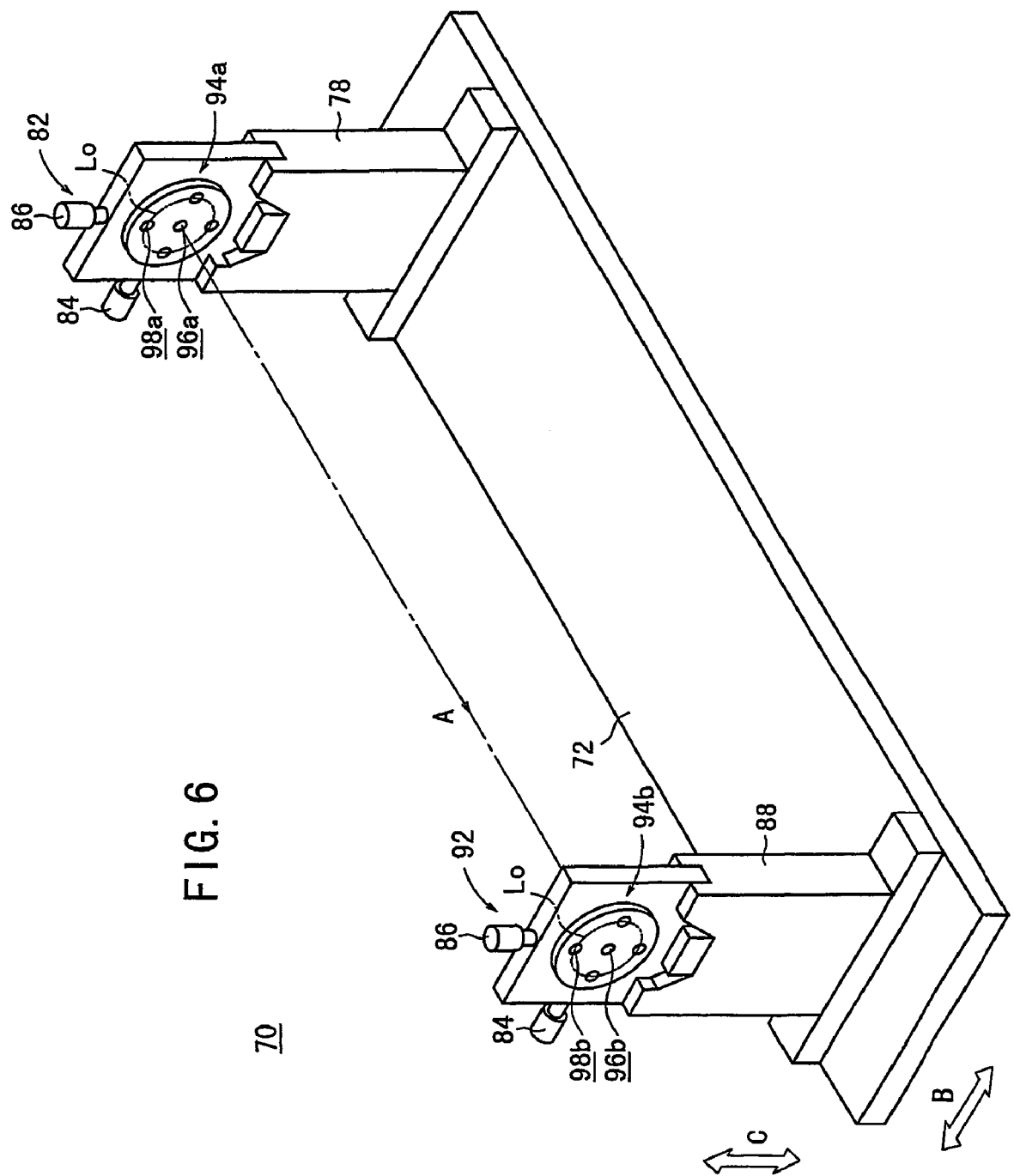
FIG. 6 is a perspective view of the optical axis unit with pinhole plates mounted thereon.

The first and second pinhole plates 74, 76 serve to adjust a point beam having a diameter of about 0.8 mm, such as the reference laser beam L. To adjust a collimated reference laser beam L0 which is a collimated beam having a diameter of about 25 mm, the first and second pinhole plates 74, 76 are replaced with first and second pinhole plates 94a, 94b shown in FIG. 6. The first and second pinhole plates 94a, 94b have respective small holes 96a, 96b defined respectively centrally therein, and respective sets of four small holes 98a, 98b defined therein around the small holes 96a, 96b along a circle having a given diameter.

The first and second pinhole plates 74, 76 are positionally adjustable vertically and horizontally by the first and second small hole position adjusting mechanisms 82, 92. However, the first and second pinhole plates 74, 76 may be integrally formed with the first and second support plates 78, 88, respectively, and the first and second pinhole plates 94a, 94b may also be integrally formed with the first and second support plates 78, 88, respectively.

Figure 7:
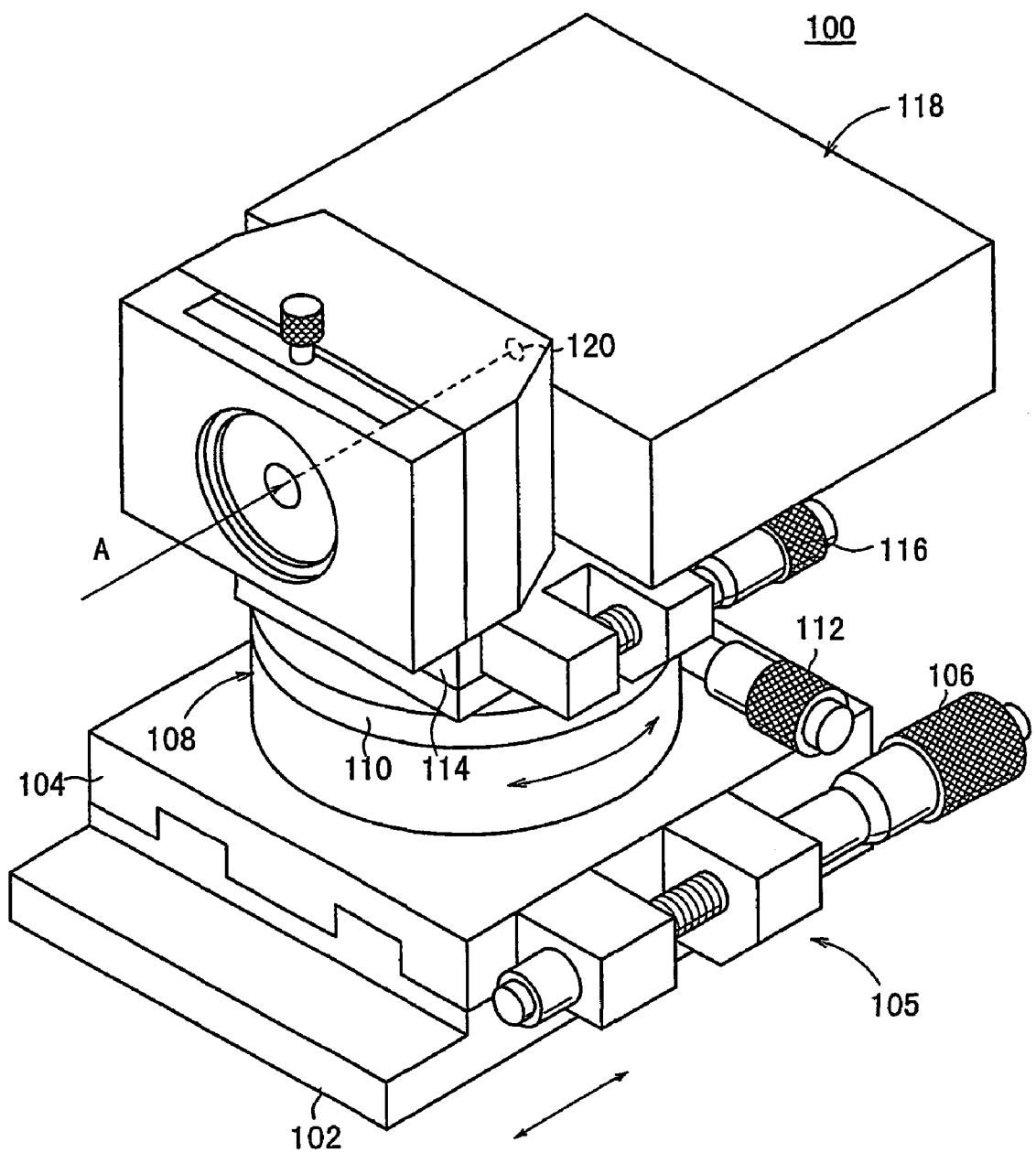
FIG. 7 is a perspective view of an optical axis detecting unit of the adjusting apparatus according to the first embodiment.
Figure 8:
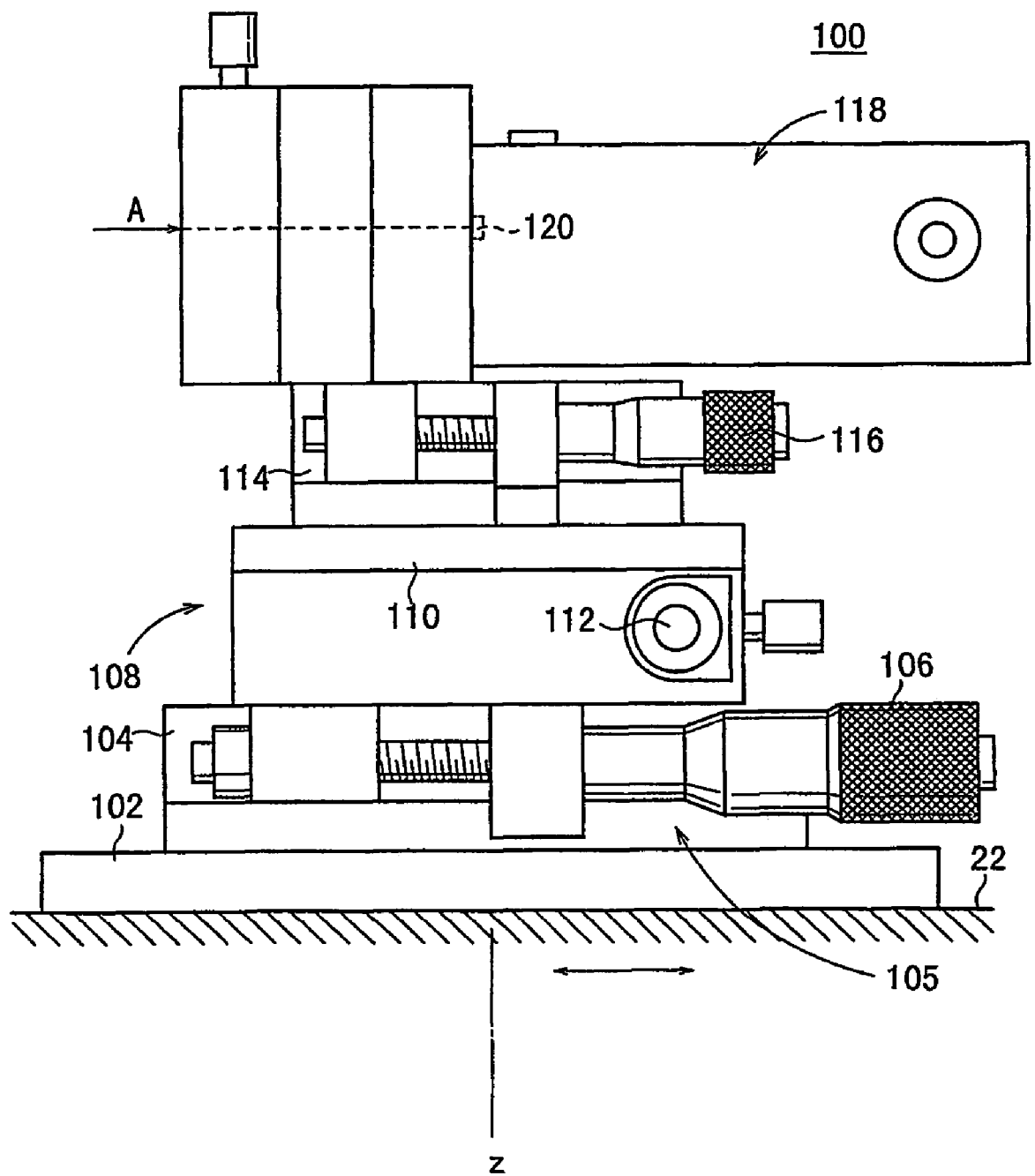
FIG. 8 is a side elevational view of the optical axis detecting unit.

FIG. 7 shows in perspective an optical axis detecting unit 100 of the adjusting apparatus according to the first embodiment, and FIG. 8 shows optical axis detecting unit 100 in side elevation. The optical axis detecting unit 100 has a unit base 102 fixedly mounted on the measurement base 22. A first slide base 104 is movably mounted on the unit base 102 for movement along the optical axis (indicated by the arrow A) by a moving mechanism 105. The moving mechanism 105 has a first slide knob 106 supported on the unit base 102 and having an end fixed to a side of the first slide base 104. When the first slide knob 106 is rotated, the first slide base 104 is moved back and forth in the directions indicated by the arrow A.

The first slide base 104 supports thereon a rotary base 110 of a rotating mechanism 108. The rotary base 110 can be rotated about a Z-axis (vertical axis) perpendicular to the optical axis of the reference laser beam L when a rotary knob 112 is rotated about its own axis. A second slide base 114 is disposed on the rotary base 110 for movement in the directions indicated by the arrow A. A second slide knob (measurement position adjusting mechanism) 116 has an end coupled to the second slide base 114. The second slide base 114 is movable a small distance in the directions indicated by the arrow A when the second slide knob 116 is rotated about its own axis.

An Optical axis position detecting sensor 118 is mounted on the second slide base 114, and a display monitor 122 (see FIG. 9) is connected to the optical axis position detecting sensor 118. The display monitor 122 displays as a visible image the position of the reference laser beam L that is introduced to an optical axis (beam dot) measurement surface 120 of the optical axis position detecting sensor 118.

Figure 10:
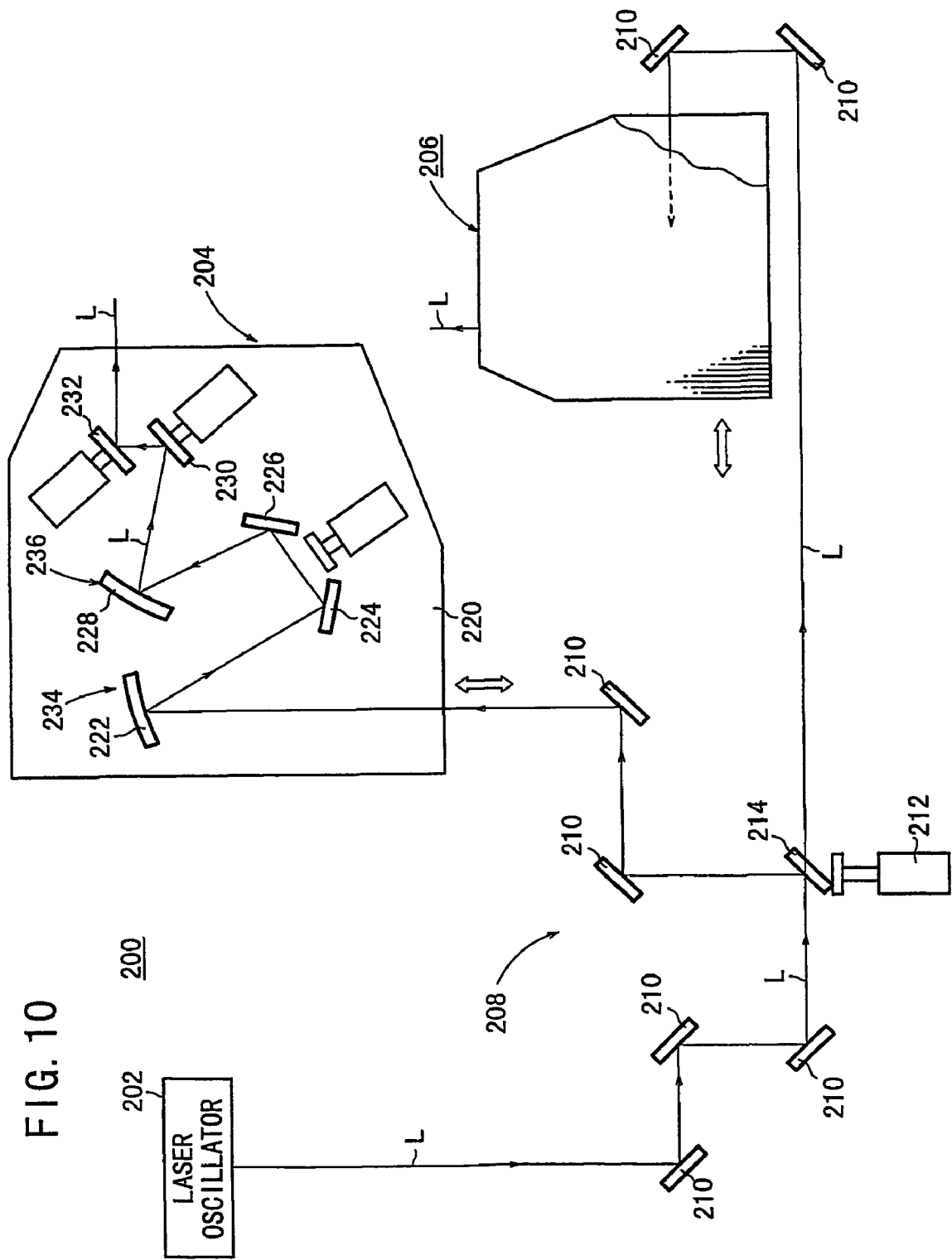
FIG. 10 is a view of a laser optical instrument incorporating an optical unit according to a first embodiment of the present invention.

FIG. 10 schematically shows a laser optical instrument 200 such as a laser beam machining device, a laser beam measuring device, etc. which incorporates an optical unit according to a first embodiment of the present invention.

The laser optical instrument 200 comprises a laser oscillator 202 for emitting a reference laser beam L, a pair of remote heads 204, 206 which can be shifted in position by actuators (not shown), and an optical path generating assembly 208 for introducing the reference laser beam L selectively into the remote heads 204, 206. The optical path generating assembly 208 comprises a plurality of plane reflecting mirrors 210, and a movable plane reflecting mirror 214 movable into and out of the optical path of the reference laser beam L by a cylinder 212 to apply the reference laser beam L selectively to the remote heads 204, 206.

Figure 11:
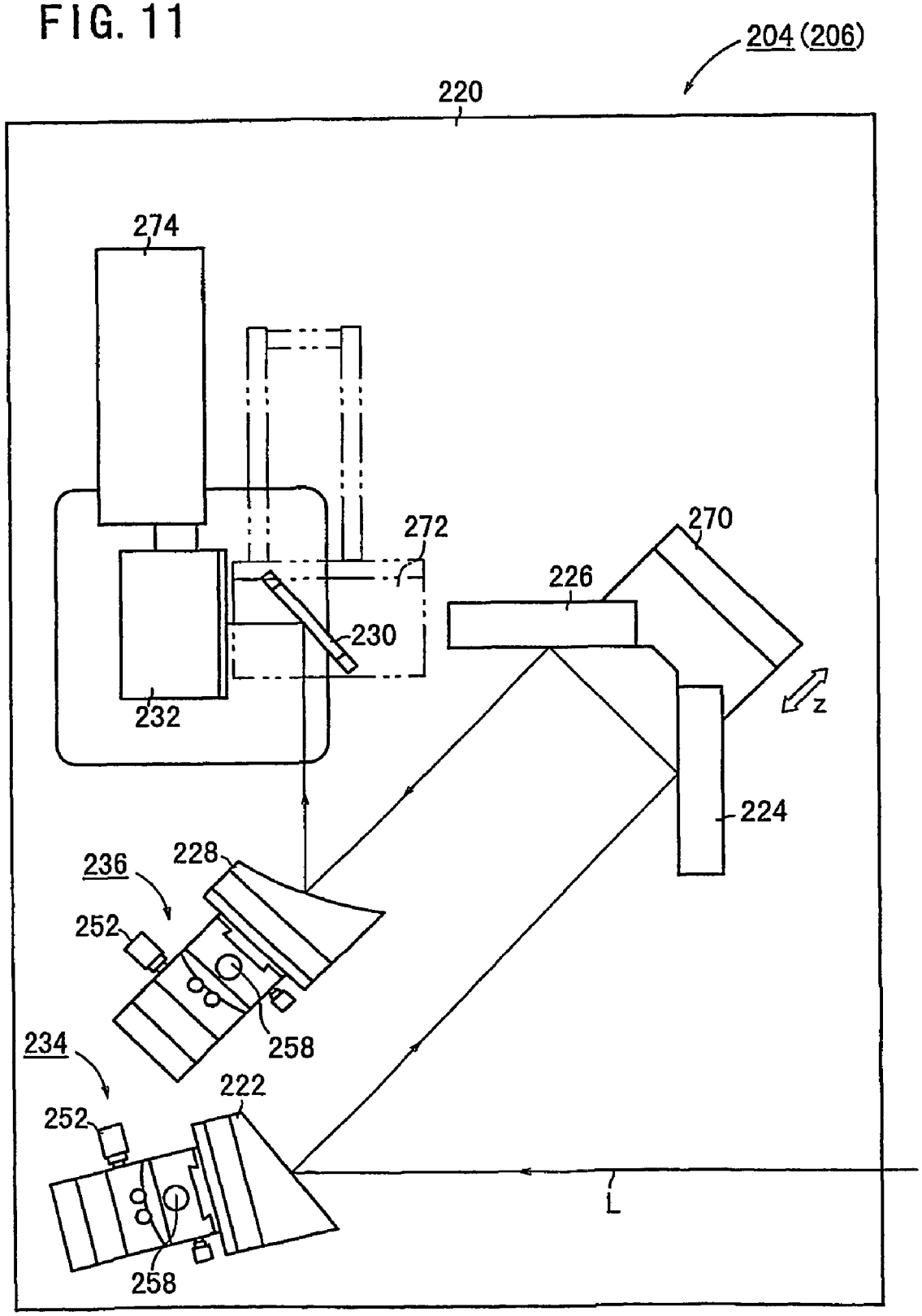
FIG. 11 is a plan view of a remote head of the laser optical instrument.

As shown in FIGS. 10 and 11, each of the remote heads 204, 206 comprises a parabolic mirror (non-plane reflecting mirror) 222, first and second plane reflecting mirrors 224, 226, an elliptical mirror (non-plane reflecting mirror) 228, a movable plane reflecting mirror 230, and a scanner plane reflecting mirror 232, all mounted as optical components on an optical tabletop 220. The parabolic mirror 222 and the elliptical mirror 228 serve as optical units 234, 236 according to the first embodiment.

Figure 12:
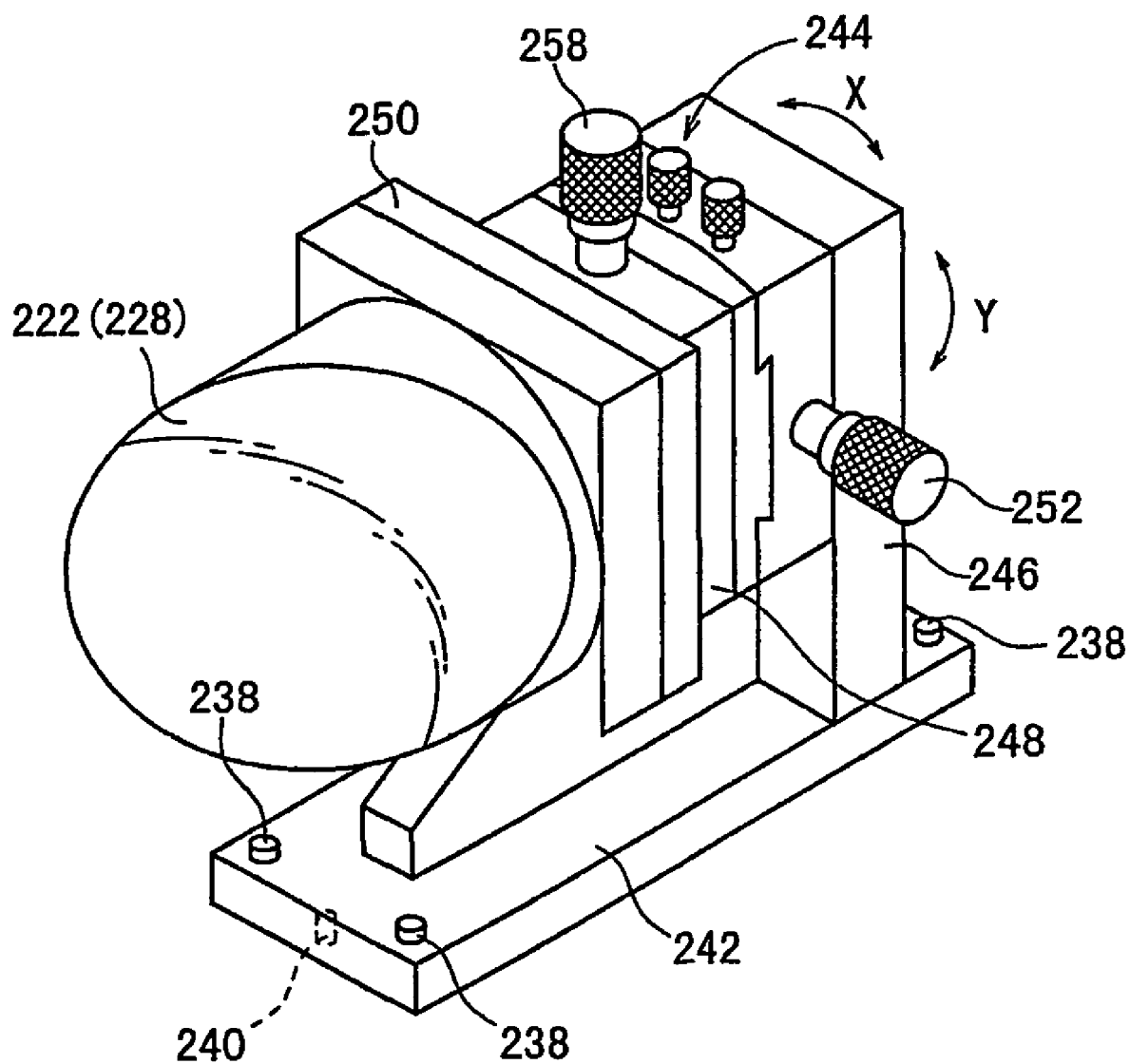
FIG. 12 is a perspective view of the optical unit.
Figure 13:
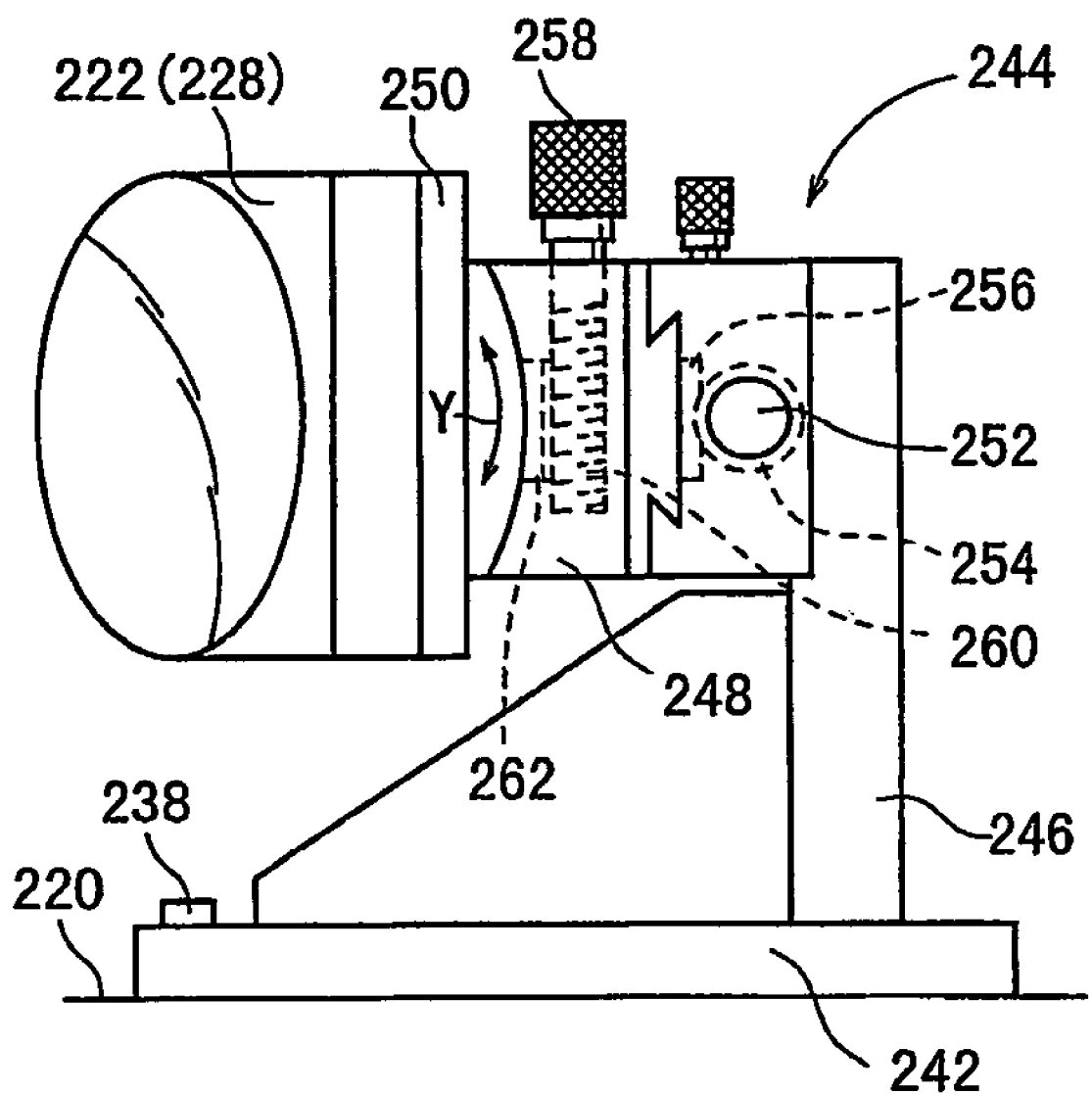
FIG. 13 is a side elevational view of the optical unit.

As shown in FIGS. 12 and 13, each of the optical units 234, 236 comprises a unit base (base member) 242 removably mounted on the optical tabletop 220 by bolts 238 and a knock pin 240, and an adjusting mechanism 244 for adjusting the position and/or angle of the parabolic mirror 222 and the elliptical mirror 228 which are mounted on the unit base 242.

A support block 246 is mounted on the unit base 242, and the adjusting mechanism 244 has a first tilting member 248 and a second tilting member 250 which are disposed on the support block 246. As shown in FIG. 13, a first knob (first operating member) 252 is horizontally mounted on the support block 246, and a first pinion 254 is mounted on the distal end of the first knob 252. The first pinion 254 is held in mesh with a first rack 256 on the first tilting member 248. When the first knob 252 is rotated about its own axis, the first tilting member 248 is turned about the optical center of the parabolic mirror 222 and the elliptical mirror 228 to adjust its angle in the directions (horizontal directions) indicated by the arrow X in FIG. 12.

A second knob (second operating member) 258 is vertically mounted on the first tilting member 248, and a second pinion 260 mounted on the distal end of the second knob 258 is held in mesh with a second rack 262 (see FIG. 13) fixed to the second tilting member 250. When the second knob 258 is rotated about its own axis, the second tilting member 250 is turned about the optical center of th parabolic mirror 222 and the elliptical mirror 228 to adjust its angle in the directions (vertical directions) indicated by the arrow Y in FIG. 13.

As shown in FIG. 11, the first and second plane reflecting mirrors 224, 226 are fixedly mounted on a block 270 which is positionally adjustable on the optical tabletop 220 in the directions indicated by the arrow Z. The movable plane reflecting mirror 230 is tiltable about a vertical axis by a motor 272. The scanner plane reflecting mirror 232 is tiltable about a horizontal axis by a scanner motor 274.

Operation of the adjusting apparatus thus will be described below in relation to an adjusting method according to a first embodiment of the present invention.

Figure 14:
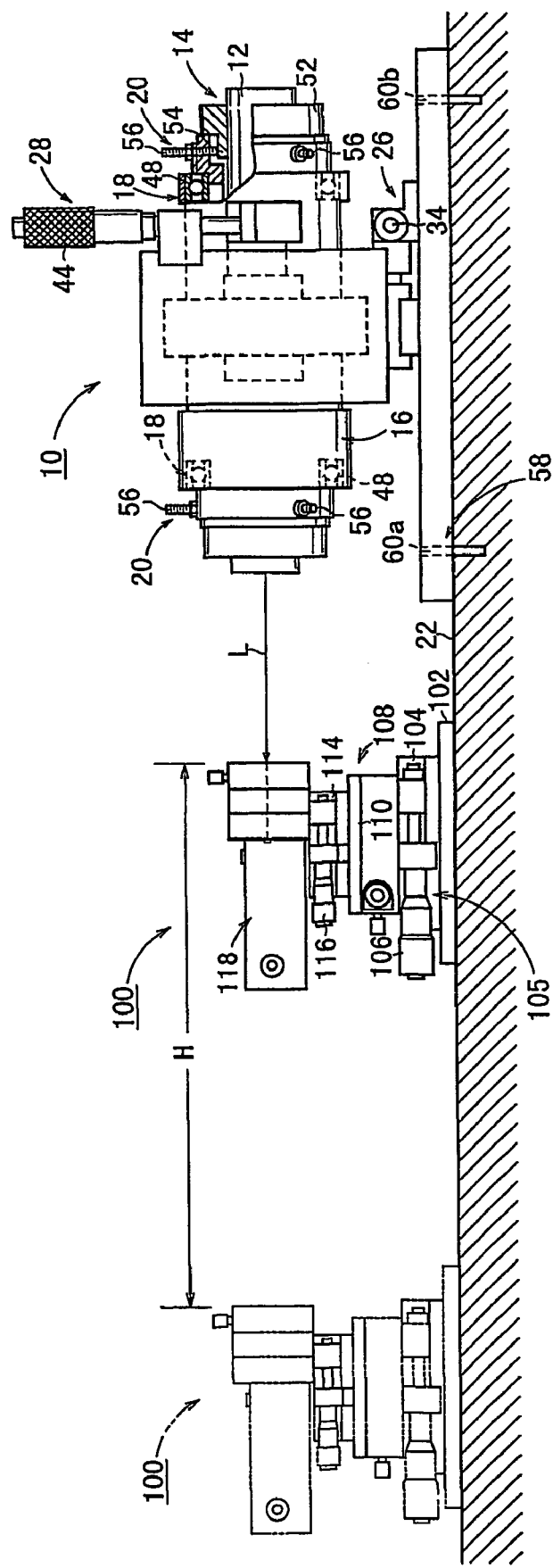
FIG. 14 is a side elevational view illustrative of a process of adjusting the optical center of the optical axis detecting unit, which is a method of adjusting an optical component according to a first embodiment of the present invention.

First, the optical center of the reference laser beam L emitted from the reference beam unit 10 is adjusted. As shown in FIG. 14, the optical axis detecting unit 100 is disposed on the optical axis of the reference beam unit 10 at a first measuring position near the reference beam unit 10.

Figure 9:
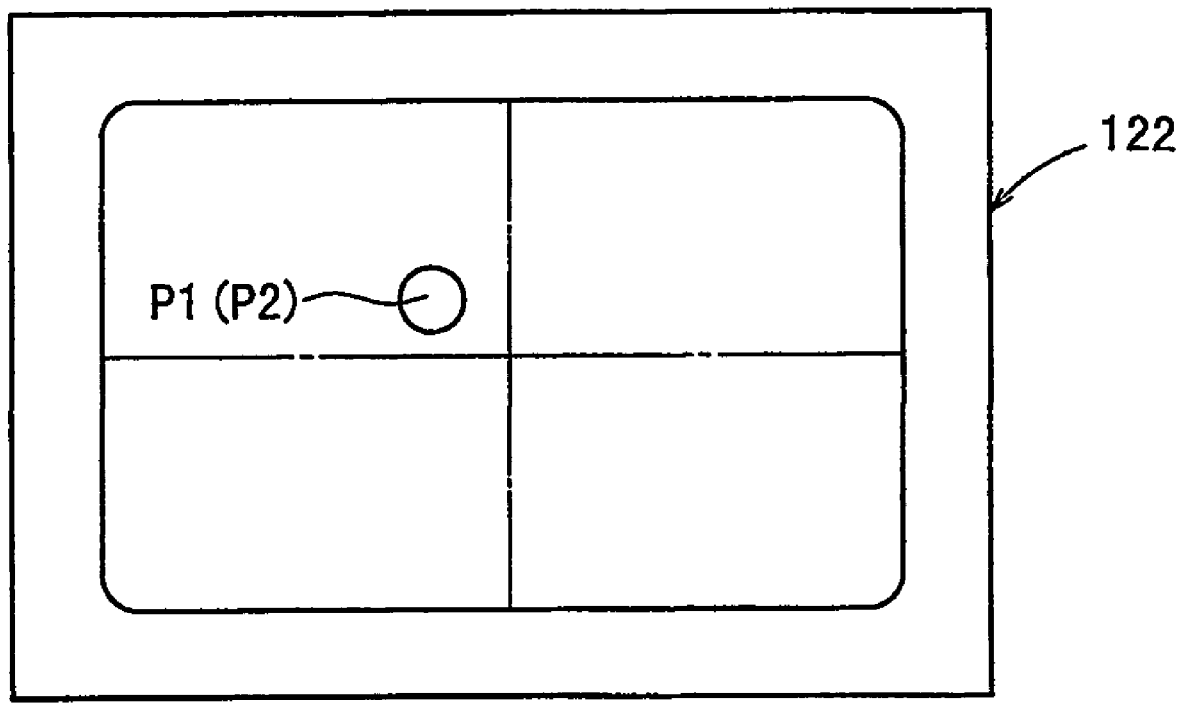
FIG. 9 is a view of the display screen of a display monitor of the optical axis detecting unit.

When the reference laser beam L is emitted from the reference beam unit 10, the reference laser beam L is applied to the beam dot measurement surface 120 of the optical axis detecting unit 100. As shown in FIG. 9, the display monitor 122 that is electrically connected to the optical axis position detecting sensor 118 displays a first optical axis position P1 of the reference laser beam L.

Then, the laser beam unit 14 is rotated with respect to the support barrel by the bearings 48 of the rotating mechanism 18. When the first optical axis position P1 displayed on the display monitor 122 is moved upon rotation of the laser beam unit 14 about the optical axis, the horizontal slide mechanism 26, the vertical slide mechanism 28, and the beam center adjusting mechanism 20 are selectively operated.

Specifically, as shown in FIG. 1, the first micrometer 34 of the horizontal slide mechanism 26 is rotated to move the rod 36 in the directions indicated by the arrow B, causing the slide base 32 fixed to the rod 36 along the guide rail 30 in the directions indicated by the arrow B.

When the second micrometer 44 of the vertical slide mechanism 28 is rotated, the rod 46 moves the support barrel 16 vertically in the directions indicated by the arrow C. When the adjustment screws 56 of the beam center adjusting mechanism 20 are turned, the holders 52 tilt the laser beam unit 14 with respect to the rotary tube 50 (see FIG. 2).

The horizontal slide mechanism 26, the vertical slide mechanism 28, and the beam center adjusting mechanism 20 are thus adjusted to make the first optical axis position P1 displayed on the display monitor 122 immovable with respect to X- and Y-axes when the laser beam unit 14 rotates about the optical axis. Th rotational center of the reference beam unit 10 is now aligned with the optical axis of the reference laser beam L.

Then the optical axis detecting unit 100 is brought into a second m asuring position (indicat d by the two-dot-and-dash lines in FIG. 14) which is spaced rearwardly from the first measuring-position-by a distanced H along the optical axis of the reference laser beam L. When the reference laser beam L is emitted from the reference beam unit 10, the reference laser beam L is introduced into the optical axis detecting unit 100. When the reference laser beam L is applied to the beam spot measuring surface 120 of the optical axis detecting unit 100, the display monitor 122 displays a second optical axis position P2 (see FIG. 9).

The laser beam unit 14 is rotated to cause the beam center adjusting mechanism 20 to make adjustments for keeping the second optical axis position P2 displayed on the display monitor 122 immovable with respect to the X- and Y-axes. At this time, it is confirmed whether the first and second optical axis positions P1, P2 are displayed as being still with respect to the X- and Y-axes.

Then, the optical axis detecting unit 100 is placed in the first measuring position again, and it is confirmed whether adjustments have been made to keep the first optical axis position P1 immovable upon rotation of the laser beam unit 14 about the optical axis as described above. If the first optical axis position P1 suffers large deviations, then the above process is repeated to bring the optical axis of the reference laser beam L into alignment with the rotational center of the reference beam unit 10. In this manner, the process of adjusting the optical axis is performed highly accurately.

The reference beam unit 10 is now capable of emitting the reference laser beam L whose optical axis and optical center have been established with high accuracy, allowing various processes of measuring various non-plane mirrors, as described later on, to be performed highly accurately.

An adjusting method according to a second embodiment of the present invention will be described below.

Figure 15:
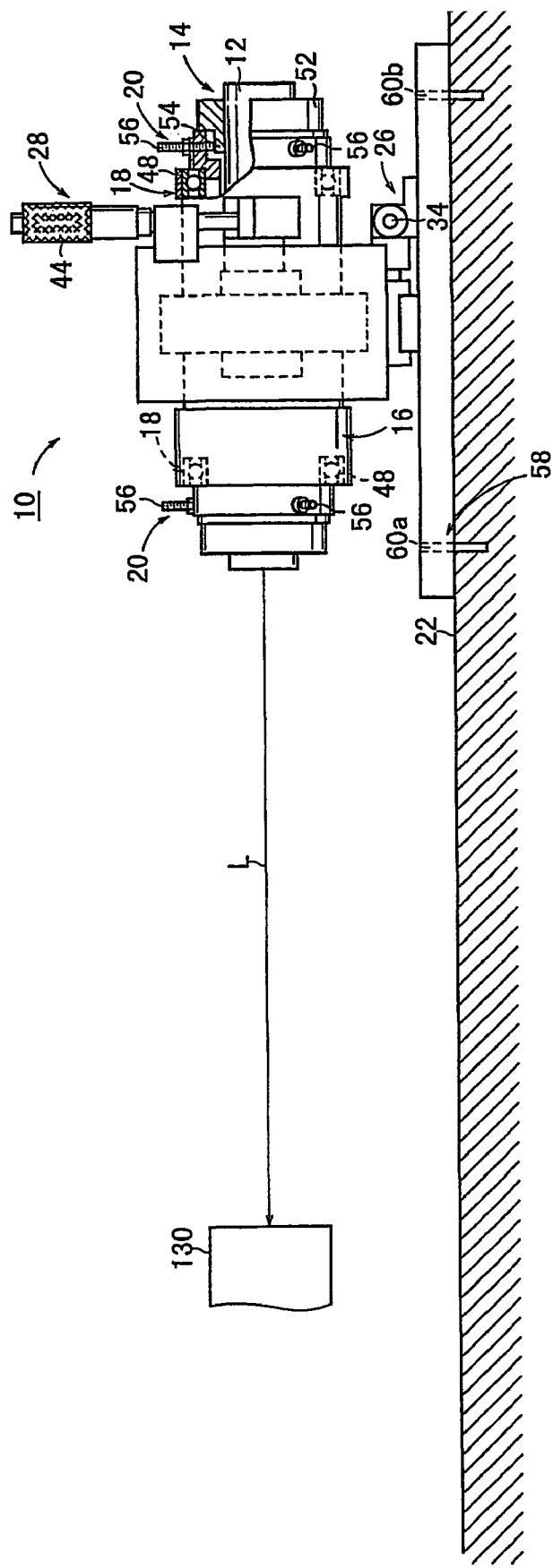
FIG. 15 is a side elevational view illustrative of a process of adjusting the reference beam unit, which is a method of adjusting an optical component according to a second embodiment of the present invention.

As shown in FIG. 15, a measurand 130 such as a machine, a wall, or the like is disposed in the optical axis of the reference beam unit 10. As with the first embodiment described above, the reference beam unit 10 emits the reference laser beam L, and the laser beam unit 14 is rotated with respect to the support barrel 16. The beam center adjusting mechanism 20 is adjusted to make the beam spot of the reference laser beam L applied to the measurand 130 immovable with respect to the X- and Y-axes. The measurand 130 may be replaced with the optical axis detecting unit 100.

Figure 16:
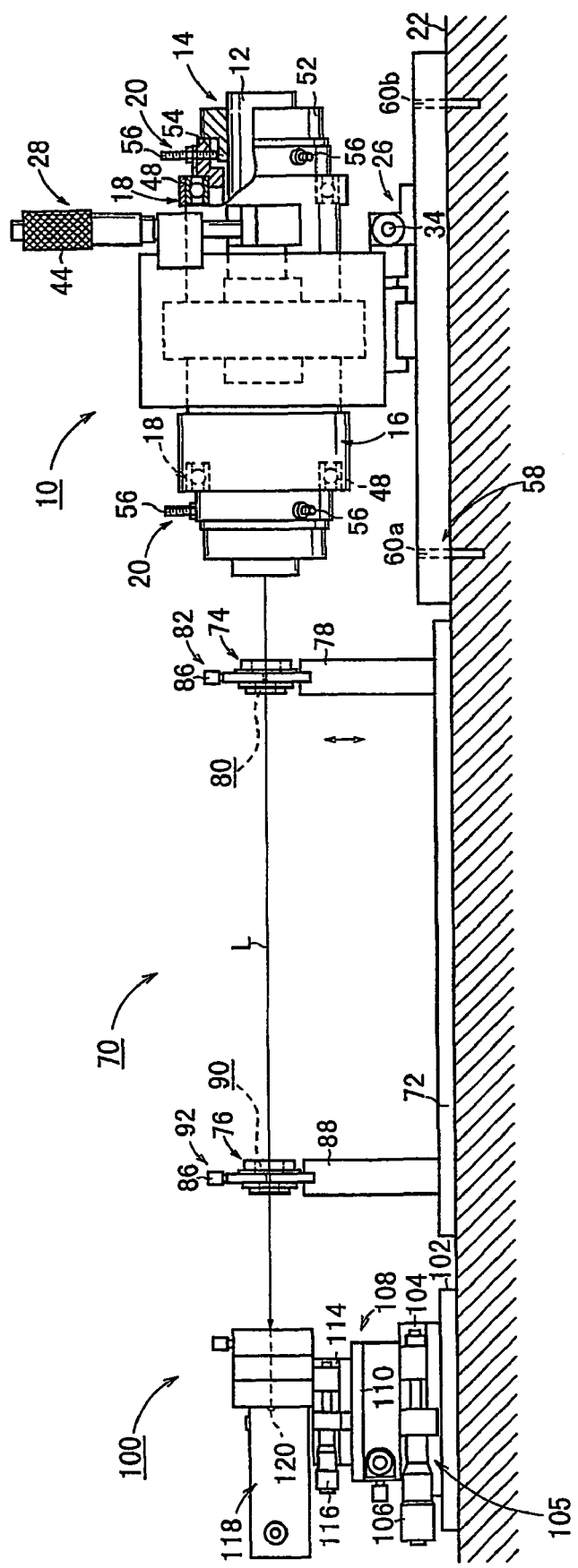
FIG. 16 is a side elevational view illustrative of the manner in which the optical axis unit is adjusted.

As shown in FIG. 16, the optical axis unit 70 is placed in the optical axis of the reference beam unit 10. When the reference laser beam L is emitted from the reference beam unit 10, the reference laser beam L passes through the first and second small holes 80, 90 defined in the first and second pinhole plates 74, 76 of the optical axis unit 70, and is then applied to the beam dot measurement surface 120 of the optical axis detecting unit 160. In the optical axis unit 70, the first and second pinhole plates 74, 76 are spaced a given distance from each other along the optical axis thereof. Only when the reference laser beam L is aligned with the optical axis of the optical axis unit 70, the reference laser beam L passes through the first and second small holes 80, 90 to the beam dot measurement surface 120.

If the reference laser beam L is displaced off the optical axis, then the reference laser beam L is blocked by the first pinhole plate 74 and/or the second pinhole plate 76, and is slightly applied to or not applied at all to the beam dot measurement surface 120. The horizontal slide mechanism 26 and the vertical slide mechanism 28 are operated to monitor the beam intensity of the reference laser beam L applied to the beam dot measurement surface 120. When the monitored beam intensity becomes maximum, the horizontal slide mechanism 26 and the vertical slide mechanism 28 completes their adjusting process, thus bringing the reference laser beam L into alignment with the optical axis. The optical axis detecting unit 100 may be replaced with the measurand 130.

As shown in FIG. 2, if the beam diameter increasing means 66 is mounted on the laser beam unit 14 to emit the collimated refer nce laser beam L0, then it is necessary to adjust the optical axis of the collimated reference laser beam L0. In the optical axis unit 70, the first and second pinhole plates 74, 76 are replaced with the first and second pinhole plates 94a, 94b, and the same process as with the adjusting method according to the second embodiment is carried out.

Specifically, the horizontal slide mechanism 26 and the vertical slide mechanism 28 of the reference beam unit 10 are operated to apply the collimated reference laser beam L0 within a given range on the first pinhole plate 94a closer to the reference beam unit 10. Then, the horizontal slide mechanism 26 and the vertical slide mechanism 28 are operated to allow the collimated reference laser beam L0 which has passed through the first pinhole plate 94a to pass through the second pinhole plate 94b that is positioned remoter from the reference beam unit 10.

The reference beam unit 10 is adjusted to maximize the beam intensity of the collimated reference laser beam L0 that has passed through the small holes 96a, 96b, 98a, 98b of the first and second pinhole plates 94a, 94b and has been applied to the beam dot measurement surface 120 of the optical axis detecting unit 100.

Then, the optical axes of the optical axis unit 70 and the optical axis detecting unit 100 are aligned with each other using the reference laser beam L whose optical axis has been established as described above.

Figure 17:
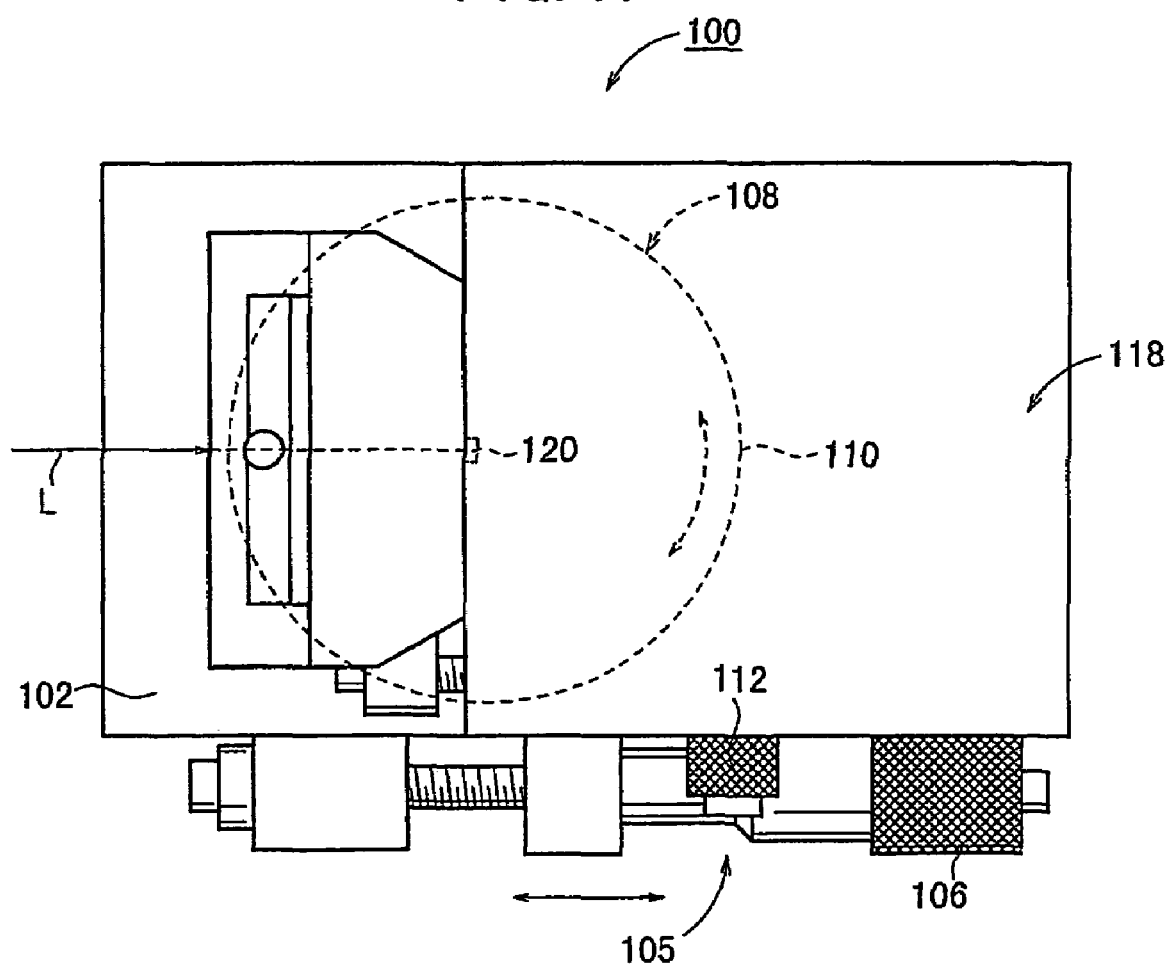
FIG. 17 is a plan view illustrative of the manner in which the optical axis of the optical axis detecting unit is aligned.

Specifically, as shown in FIG. 17, the optical axis detecting unit 100 is placed in a given position on the optical axis of the reference beam unit 10. When the reference laser beam L is emitted from the reference beam unit 10, the reference laser beam L is applied to the beam dot measurement surface 120 of the optical axis detecting unit 100. Then, the rotary base 110 of the rotating mechanism 108 is angularly moved, and the second slide base 114 is moved along the optical axis by the second slide knob 116.

As shown in FIG. 9, the second slide base 114 is stopped in a position where the first optical axis position P1 on the display monitor 122 is immovable. The rotational axes of the beam dot measurement surface 120 and the rotating mechanism 108 are now aligned with each other, thus detecting the position of the beam dot measurement surface 120.

Figure 18:
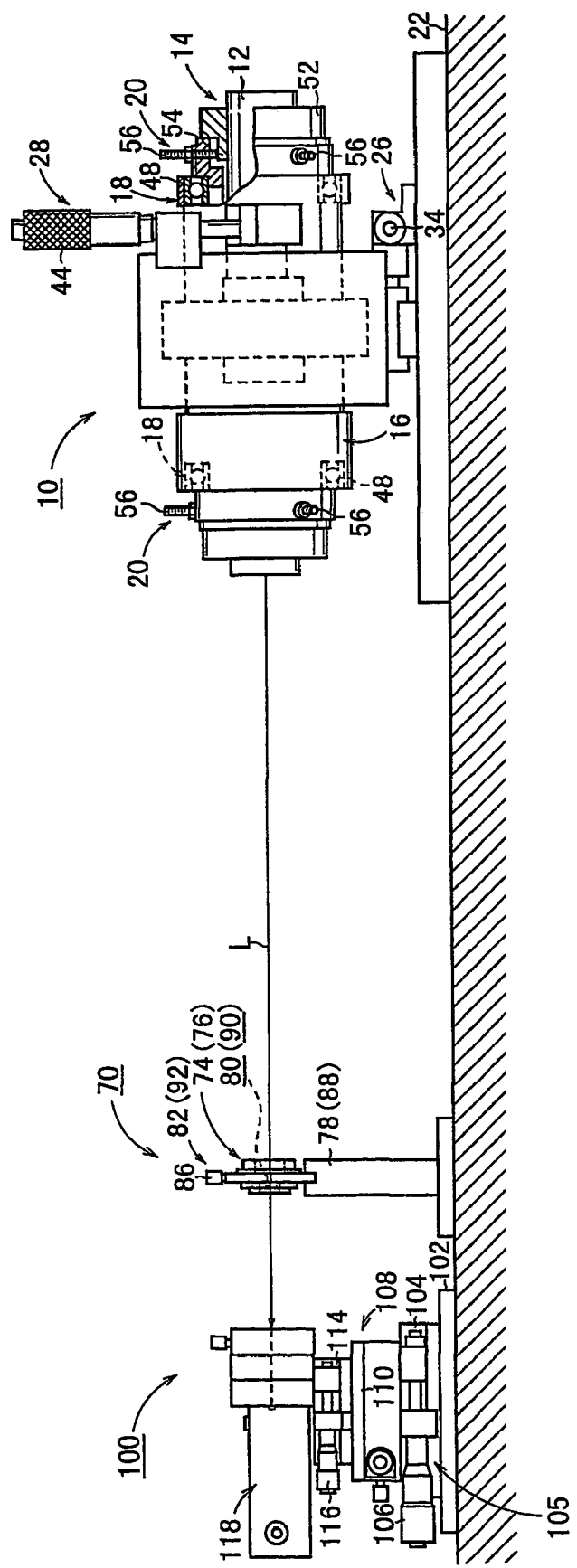
FIG. 18 is a side elevational view illustrative of the manner in which the optical axis of the optical axis unit is aligned.

For aligning the optical axis of the optical axis unit 70, as shown in FIG. 18, the first pinhole plate 74 is placed between the reference beam unit 10 and the optical axis detecting unit 100. When the reference laser beam L is emitted from the reference beam unit 10, the reference laser beam L passes through the first small hole 80 defined in the first pinhole plate 74 and is applied to the beam dot measurement surface 120 of the optical axis detecting unit 100. The optical axis detecting unit 100 monitors the intensity of the reference laser beam L that has passed through the first small hole 80. The first small hole position adjusting mechanism 82 is operated to maximize the monitored intensity of the reference laser beam L.

Specifically, the first and second adjustment screws 84, 86 are turned to positionally adjust the first pinhole plate 74 vertically and horizontally. The first small hole 80 is aligned with the optical axis in a position where the intensity of the beam passing through the first small hole 80 is maximum.

Similarly, the second pinhole plate 76 is placed between the reference beam unit 10 and the optical axis detecting unit 100, and the second small hole 90 defined in the second pinhole plate 76 is brought into alignment with the optical axis. In this manner, the optical axis of the optical axis unit 70 is adjusted.

A process of aligning the optical axis of the parabolic mirror 222 using the reference beam unit 10 and the optical axis unit 70, which are thus adjusted, according to a third embodiment of the present invention will be described below. A process of aligning the optical axis of the elliptical mirror 228 is similarly carried out and will not be described below.

Figure 19:
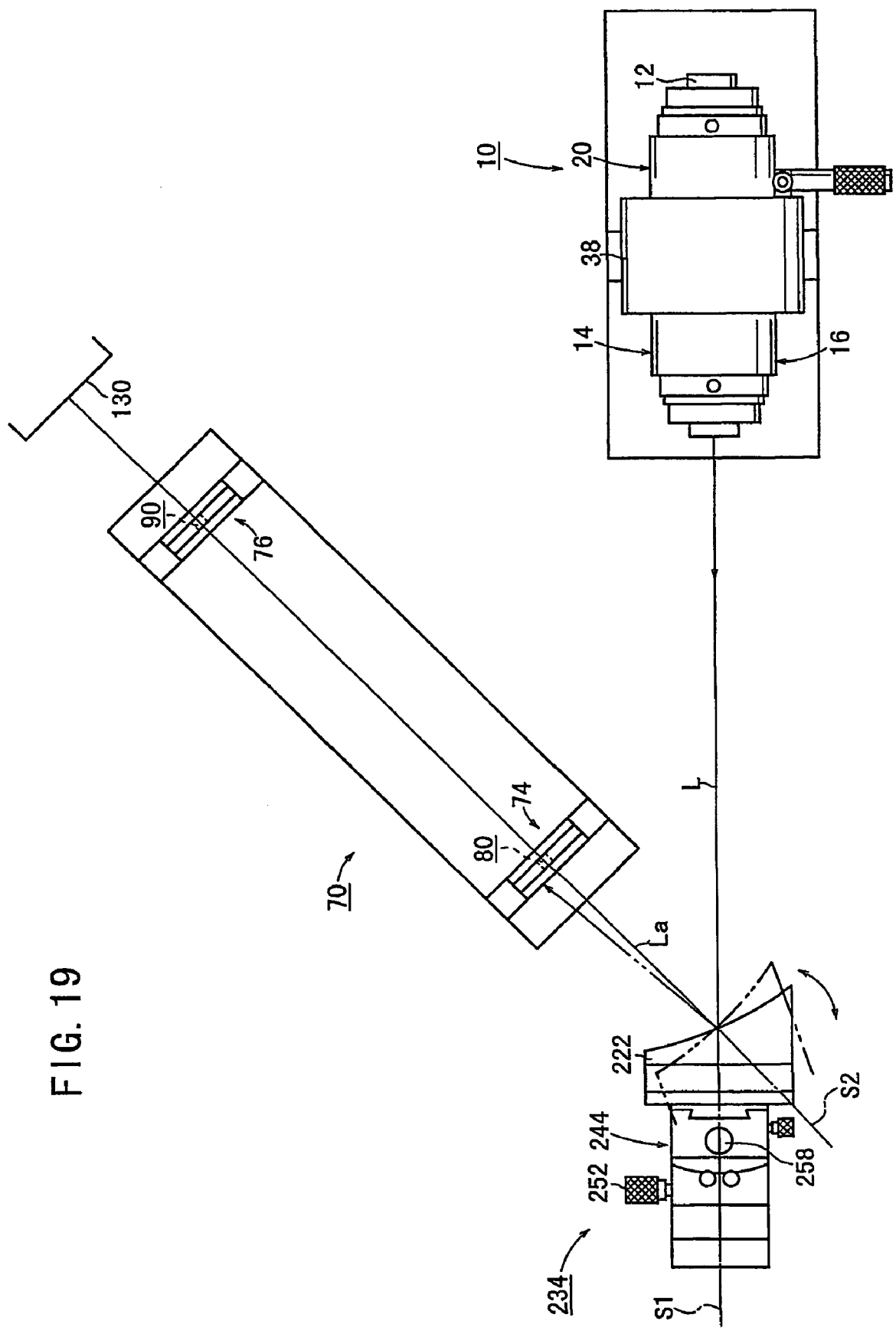
FIG. 19 is a view illustrative of a process of aligning the optical axis of a parabolic mirror, which is a method of adjusting an optical component according to a third embodiment of the present invention.

As shown in FIG. 19, the optical unit 234 which incorporates the parabolic mirror 222 is placed in the optical axis S1 of the reference beam unit 10, and the optical unit 70 is placed in the optical axis S2 of a reflected beam La from the parabolic mirror 222. The optical unit 234 is placed under the same conditions as the optical tabletop 220.

When the reference laser beam L is emitted from the reference beam unit 10, the reference laser b am L is applied along the optical axis S1 to the parabolic mirror 222. If the parabolic mirror 222 is accurately positioned in a predetermined location, then the reflected light La from the parabolic mirror 222 passes through the first and second small holes 80, 90 defined in the first and second pinhole plates 74, 76 of the optical axis unit 70 disposed in the optical axis S2 and is applied to the measurand 130.

In the optical axis unit 70, the first and second pinhole plates 74, 76 are spaced a given distance apart from each other along the optical axis S2. Only then the reflected light La from the parabolic mirror 222 is aligned with the optical axis S2, the reflected light La passes through the first and second small holes 80, 90 and is applied to the measurand 130. Therefore, if the parabolic mirror 222 is displaced off the desired position as indicated by the two-dot-and-dash lines in FIG. 19, then the reflected light La is blocked by the first pinhole plate 74 and/or the second pinhole plate 76, and is not applied to the measurand 130.

If the optical axis of the parabolic mirror 222 is displaced, then the adjusting mechanism 244 is used to adjust the optical axis of the parabolic mirror 222. Specifically, as shown in FIGS. 12 and 13, the first knob 252 is rotated to rotate the first pinion 254 on the first knob 252, thus moving the first rack 256 to tilt the first tilting member 248 about the optical center of the parabolic mirror 222 in the horizontal directions indicated by the arrow X. When the second knob 258 is rotated to rotate the second pinion 260 on the second knob 258, the second rack 262 is tilted in unison with the second tilting member 250 about the optical center of the parabolic mirror 222 in the vertical directions indicated by the arrow Y.

Therefore, the parabolic mirror 222 is adjusted in angular position when the first and second tilting members 248, 250 are tilted. The parabolic mirror 222 is positioned highly accurately and reliably in a position where the reflected beam La from the parabolic mirror 222 passes through the first and second pinhole plates 74, 76 and is applied to the measurand 130.

The optical center of the reference laser beam L emitted from the reference beam unit 10 is highly accurately adjusted into alignment with the mechanical axial center. The first and second pinhole plates 74, 76 which are spaced a given distance from each other along the optical axis S2 are employed. Therefore, the optical axis of the parabolic mirror 222 is aligned highly accurately and efficiently with a simple arrangement.

In the third embodiment, the measurand 130 is disposed in the optical axis of the reflected beam La, and the reflected beam La applied to the measurand 130 is visually detected. A measuring structure incorporating a reflecting mirror and a reticle may be used to perform the visual inspection procedure more easily and accurately.

A process of adjusting the optical center of the parabolic mirror 222 using the reference beam unit 10 and the optical axis unit 100 according to a fourth embodiment of the present invention will be described below.

Figure 20:
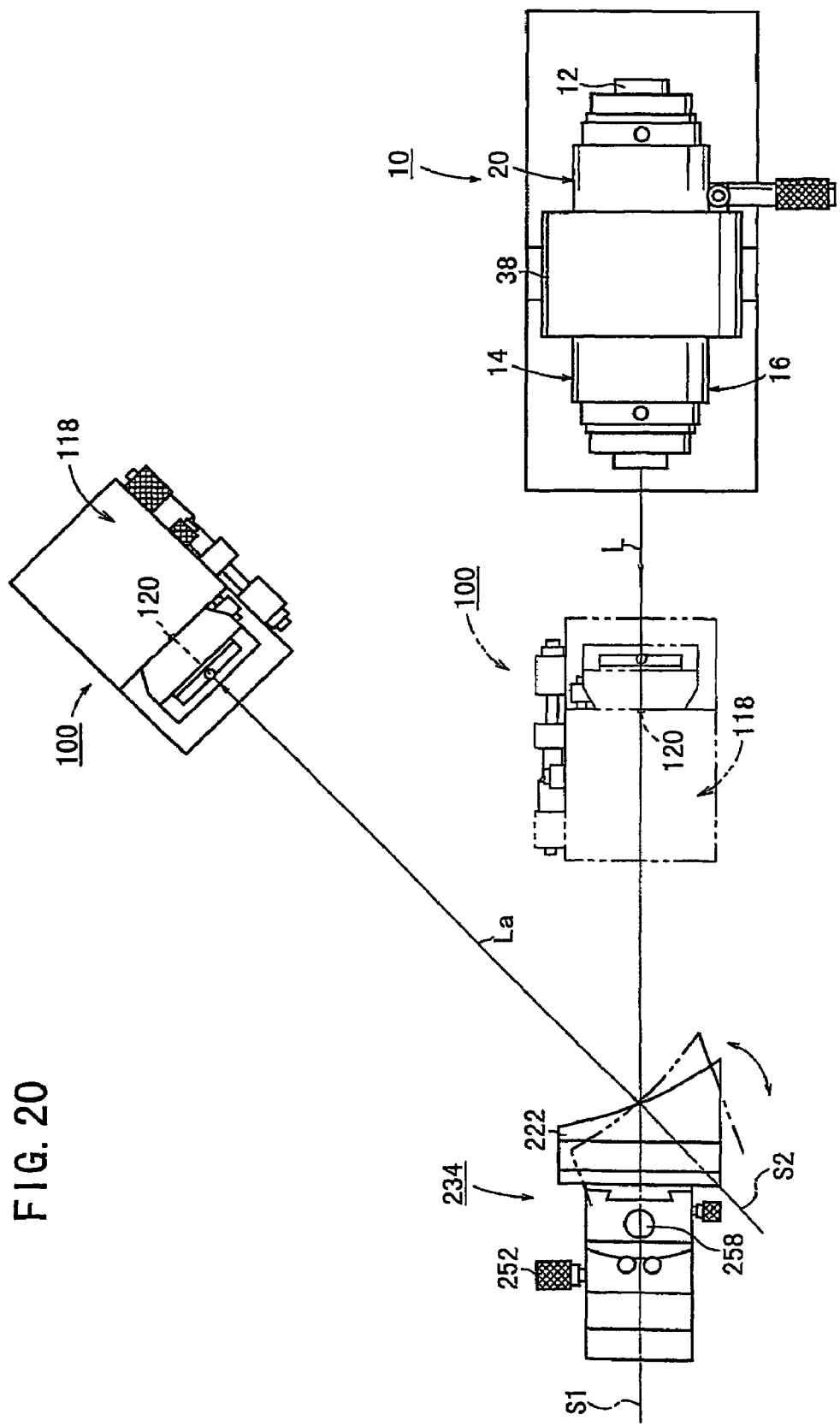
FIG. 20 is a view illustrative of a process of aligning the optical axis of the parabolic mirror, which is a method of adjusting an optical component according to a fourth embodiment of the present invention, using a referenced beam unit and an optical axis detecting unit.

As shown in FIG. 20, the optical axis detecting unit 100 is temporarily placed, as indicated by the two-dot-and-dash lines, between the reference beam unit 10 and the parabolic mirror 222. When the reference laser beam L is emitted from the reference beam unit 10, the reference laser beam L is applied to the beam dot measurement surface 120 of the optical axis detecting unit 100. Therefore, the display monitor 122 electrically connected to the optical axis position detecting sensor 118 displays the first optical axis position P1 of the reference laser beam L.

Then, the optical axis detecting unit 100 is removed out of the optical axis S1, and the optical axis detecting unit 100 or another optical axis detecting unit 100 is placed in the optical axis S2 of the reflected beam La from the parabolic mirror 222. When the reference laser beam L from the reference beam unit 10 is applied, the reference laser beam L is reflected by the parabolic mirror 222, and the reflected beam La therefrom is introduced into the optical axis detecting unit 100 that is placed in the optical axis S2 of the reflected beam La. When the reflected beam La is applied to the beam spot measurement surface 120 in the optical axis detecting unit 100, the display monitor 122 displays the second optical axis position P2 (see FIG. 9).

The parabolic mirror 222 is adjusted in angular position to align the first optical axis position P1 detected in advance on the optical axis S1 with the second optical axis position P2 of the reflected beam La from the parabolic mirror 222.

In the fourth embodiment, therefore, since only the reference beam unit 10 and the optical axis detecting unit 100, the second optical axis position P2 of the reflected beam La from the parabolic mirror 222 can be aligned with the optical axis S2 highly accurately and easily with a simple arrangement and process.

Then, the focal points of the parabolic mirror 222 and the elliptical mirror 228 are measured using the reference beam unit 10 and the optical axis unit 100.

Figure 21:
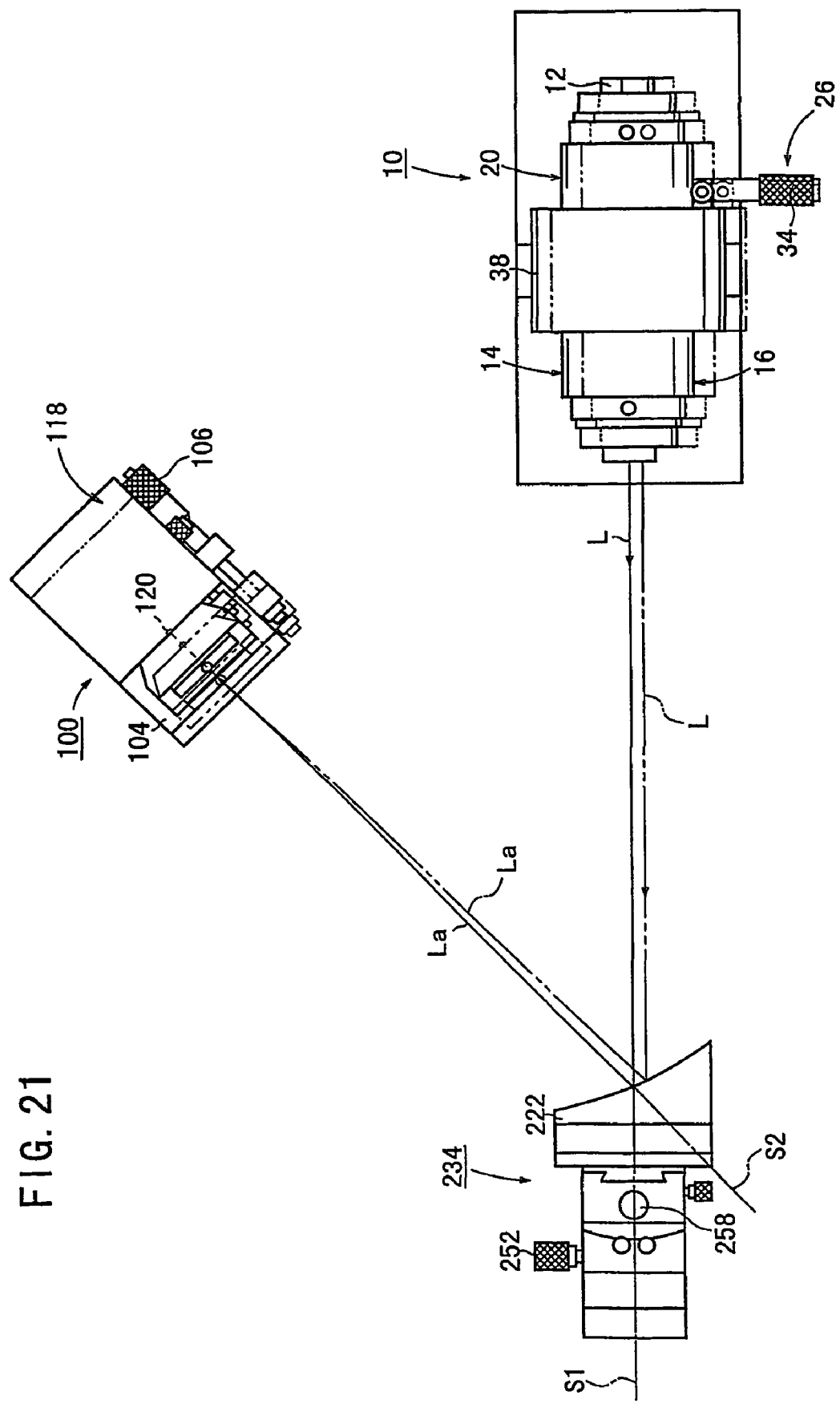
FIG. 21 is a view illustrative of the manner in which the focal point of a parabolic mirror is detected.

For the parabolic mirror 222, as shown in FIG. 21, the first micrometer 34 of the horizontal slide mechanism 26 is rotated to translate the reference beam unit 10 in the horizontal directions indicated by the arrow B, and emits the reference laser beam L. In the optical axis detecting unit 100 disposed near the focal point of the parabolic mirror 222, the first slide knob 106 is rotated to move the first slide base 104 along the optical axis S2. The reference laser beam L emitted from the reference beam unit 10 is reflected by the parabolic mirror 222 and applied to the beam spot measurement surface 120 of the optical axis detecting unit 100. At this time, a position where the movement of the optical axis is minimum is measured as the focal point (length) of the parabolic mirror 222.

Figure 22:
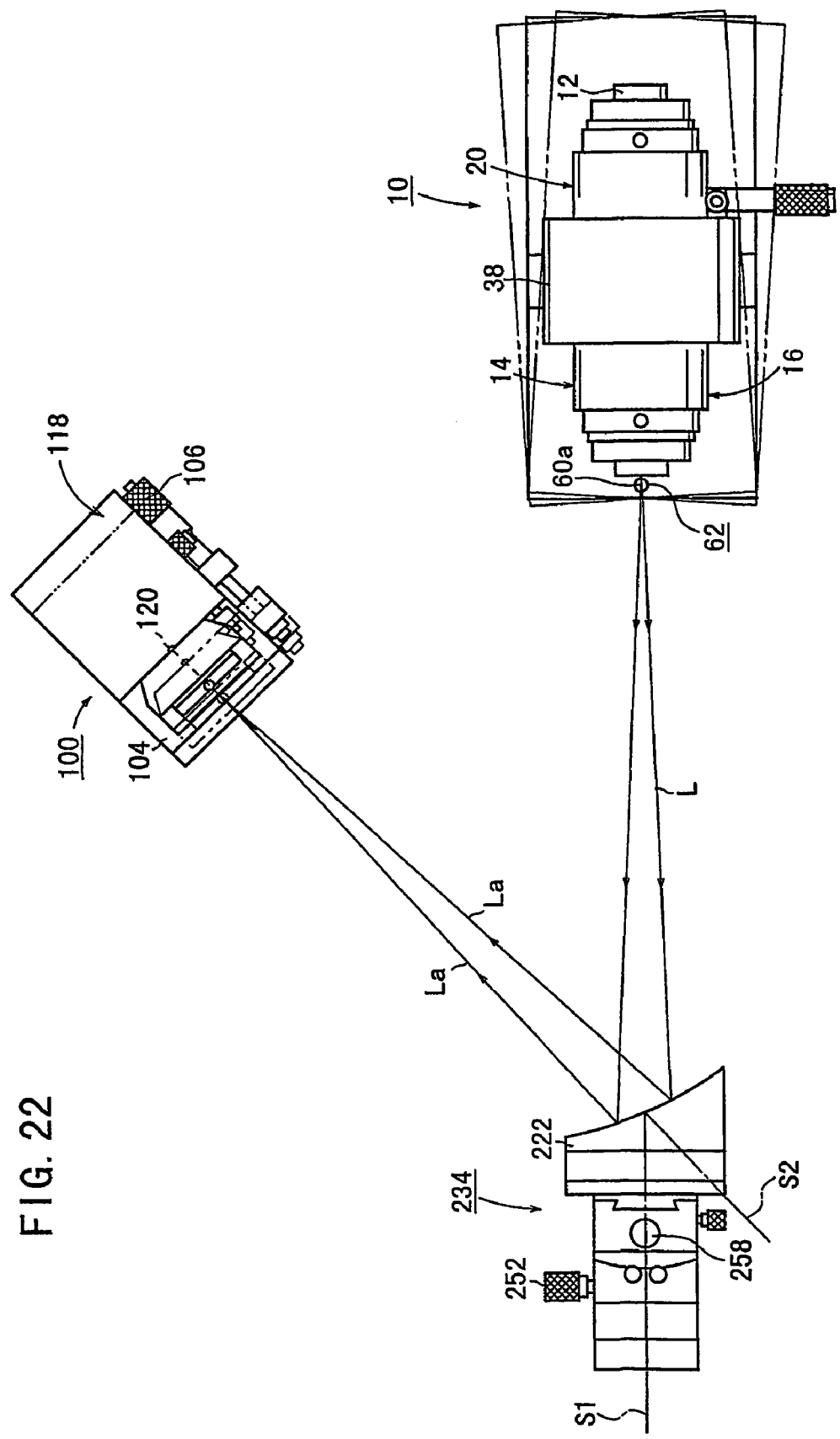
FIG. 22 is a view illustrative of the manner in which the focal point of an elliptical mirror is detect d.

For the elliptical mirror 228, as shown in FIG. 22, the reference beam unit 10 emits the reference laser beam while being tilted horizontally about the knock pin 60a and the hole 62, and the optical axis detecting unit 100 moves along the optical axis S2. A position where the movement of the optical axis detected on the beam spot measurement surface 120 of the optical axis detecting unit 100 is minimum is measured as the focal point (length) of the elliptical mirror 228.

Figure 23:
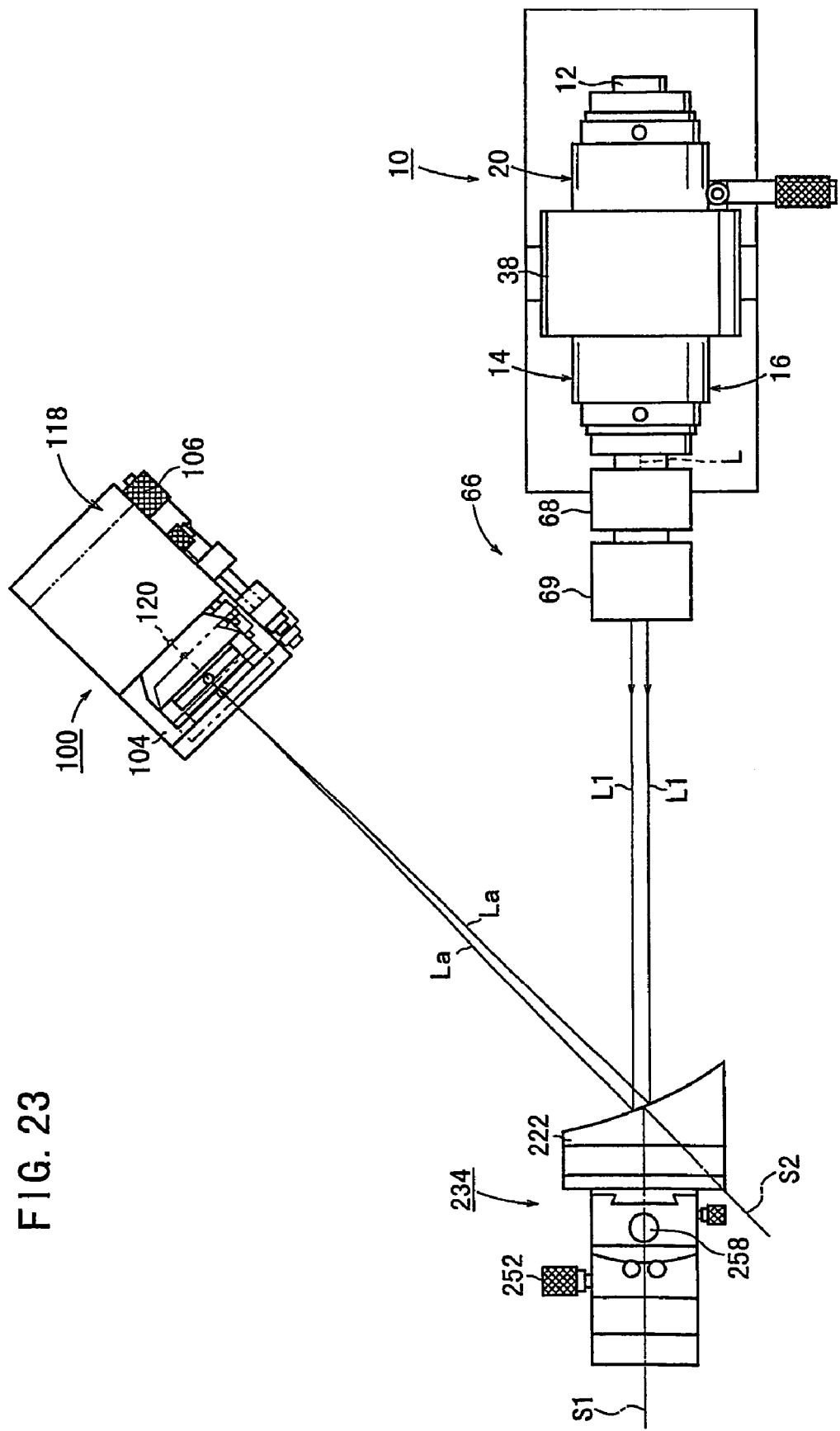
FIG. 23 is a view illustrative of the manner in which the focal point of the parabolic mirror is detected.

For the parabolic mirror 222, as shown in FIG. 23, the beam diameter increasing means 66 may be installed on the reference beam unit 10, and the focal point of the parabolic mirror 222 may be measured using the collimated beam L1.

In the reference beam unit 10, the reference laser beam L emitted from the laser beam unit 14 is converted by the beam diameter increasing means 66c into the collimated beam L1, which is reflected by the parabolic mirror 222 to the beam spot measurement surface 120 of the optical axis detecting unit 100. The optical axis detecting unit 100 moves along the optical axis S2, and a position where the area of the beam spot on the beam spot measurement surface 120 is measured as the focal point of the parabolic mirror 222. Therefore, the reference beam unit 10 does not need to be moved, but the focal point of the parabolic mirror 222 can be measured quickly with a simple arrangement.

In the above embodiments, the optical axis of the reference beam unit 10 which emits the reference laser beam L is accurately established, and the optical axis unit 70 and the optical axis detecting unit 100 are accurately adjusted using the reference beam unit 10.

Therefore, using the reference beam unit 10, the optical axis unit 70, the optical axis detecting unit 100 selectively or in combination, the optical axes and the focal points of the parabolic mirror 222 and the elliptical mirror 228 can be adjusted highly accurately and efficiently. Furthermore, alignment adjustments for various non-plane mirrors can be performed accurately, allowing high-quality laser machining processes and highly accurate laser measuring processes to be performed.

Figure 24:
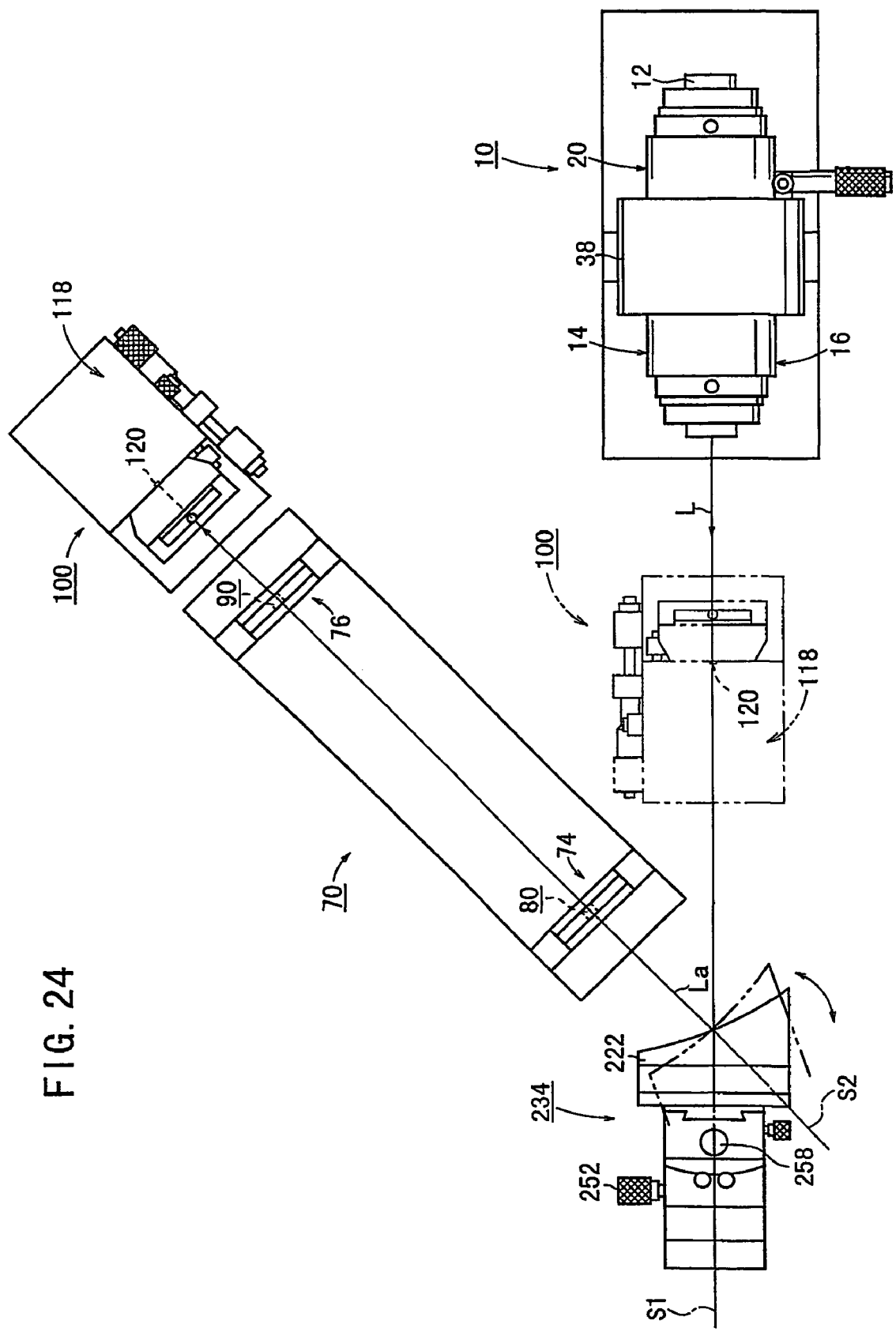
FIG. 24 is a view illustrative of a method-of detecting an optical axis according to a fifth embodiment of the present invention.

A method of detecting an optical axis according to a fifth embodiment of the present invention using the reference beam unit 10, the optical axis unit 70, the optical axis detecting unit 100 will be described below with reference to FIG. 24. In the fifth embodiment, the method is used in the positional adjustment of non-plane mirrors including the parabolic mirror 222 and the elliptical mirror 228. The method will be described below with respect to the parabolic mirror 222.

The optical axis unit 70 is placed in the optical axis S2 of the reflected beam La from the parabolic mirror 222, and the optical axis detecting unit 100 is positioned on the exit side of the optical axis unit 70. In the fifth embodiment, the reference laser beam L emitted from the reference beam unit 10 is reflected by the parabolic mirror 222, and the parabolic mirror 222 is adjusted in position and angle to cause the reflected beam La to pass through the first and second pinhole plates 74, 76 of the optical axis unit 70 and be applied to the beam dot measurement surface 120 of the optical axis detecting unit 100.

Figure 25:
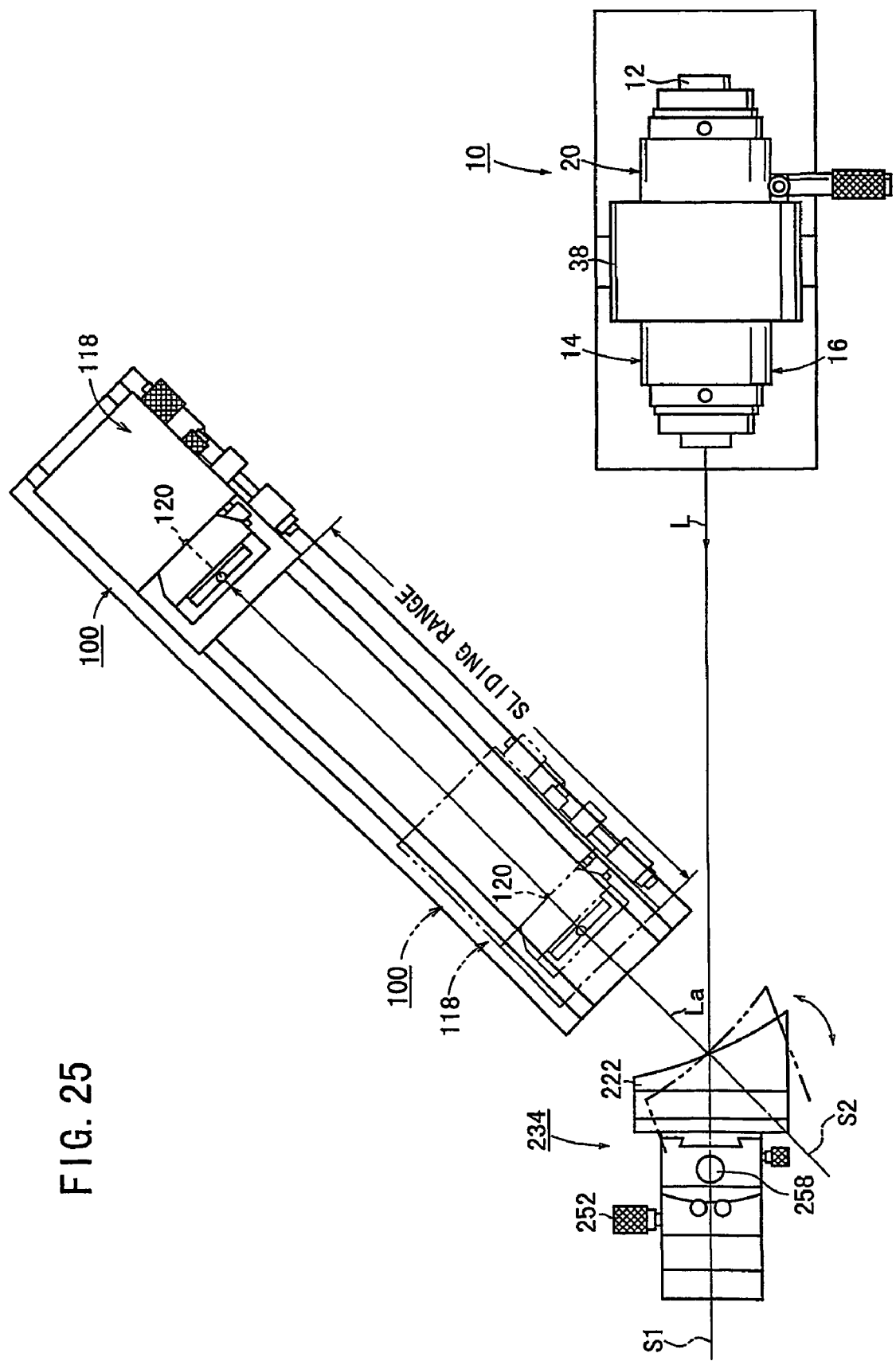
FIG. 25 is a view illustrative of a method of detecting an optical axis according to a sixth embodiment of the present invention.

FIG. 25 is illustrative of a method of detecting an optical axis according to a sixth embodiment of the present invention to adjust the parabolic mirror 222 using the reference beam unit 10 and the optical axis detecting unit 100.

In the sixth embodiment, the optical axis detecting unit 100 is placed in a first position (indicated by the two-dot-and-dash lines in FIG. 25) near the parabolic mirror 222 on the optical axis S2, and the reference beam unit 10 is energized to emit the reference laser beam L. The reference laser beam L is reflected by the parabolic mirror 222, which applies the reflected beam La to the beam dot measurement surface 120 of the optical axis detecting unit 100 in the first position. Therefore, the first optical axis position of the reflected beam La is detected.

Then, the optical axis detecting unit 100 is placed in a second position (indicated by the solid lines in FIG. 25) remote from the parabolic mirror 222 on the optical axis S2. The reference laser beam L emitted from the reference beam unit 10 is reflected by the parabolic mirror 222, which applies the reflected beam La to the beam dot measurement surface 120 of the optical axis detecting unit 100 in the second position. Therefore, the second optical axis position of the reflected beam La is detected. The parabolic mirror 222 is positionally adjusted to bring the first optical axis position P1 of the reflected beam La in the first position and the second optical axis position P2 of the reflected beam La in the second position into conformity with each other.

In the first through sixth embodiments, as described above, the reference beam unit 10 for emitting the reference laser beam L whose optical axis has been established is provided, and used selectively or in combination with the optical axis unit 70 and the optical axis detecting unit 100 to adjust the optical axes of various optical components including the parabolic mirror 222 highly accurately and efficiently. Therefore, the arrangement is simplified and used in wide applications. Furthermore, alignment adjustments for various optical components can be performed accurately, allowing high-quality laser machining processes and highly accurate laser measuring processes to be performed.

The optical units 234, 236 thus aligned for optical axes and measured for focal points are mounted in respective positions on the optical tabletop 220. The unit bases 242 are positioned on and fixed to the optical tabletop 220 by the knock pins 240 and bolts 238.

The parabolic mirror 222 and the elliptical mirror 228 are mounted by the adjusting mechanisms 244 on the respective optical units 234, 236 according to the first embodiment. The optical units 234, 236 are removed from the optical tabletop 220 and installed in an inspection facility under the same conditions as with the optical tabletop 220. Then, the parabolic mirror 222 and the elliptical mirror 228 are aligned for optical axes and measured for focal points. Thereafter, simply when the optical units 234, 236 are installed back in respective positions on the optical tabletop 220, the parabolic mirror 222 and the elliptical mirror 228 are well aligned for optical axes and measured for focal points with respect to the optical tabletop 220.

In the first embodiment, alignment adjustments for the parabolic mirror 222 and the elliptical mirror 228 are not required to be performed on the optical tabletop 220, but can be performed efficiently and accurately with a simple arrangement and process.

The adjusting mechanism 244 has the first tilting member 248 which is tiltable in the directions indicated by the arrow X (one direction) about the optical centers of the parabolic mirror 222 and the elliptical mirror 228 and the second tilting member 250 which is tiltable in the directions indicated by the arrow Y (the other direction) perpendicular to the directions indicated by the arrow X, about the optical centers of the parabolic mirror 222 and the elliptical mirror 228 with respect to the first tilting member 248.

Therefore, when the first and second knobs 252, 258 are rotated, the parabolic mirror 222 and the elliptical mirror 228 are easily and highly accurately aligned for optical axes and measured for focal points. Such alignment adjustments can be performed simply by rotating the first and second knobs 252, 258.

Figure 26:
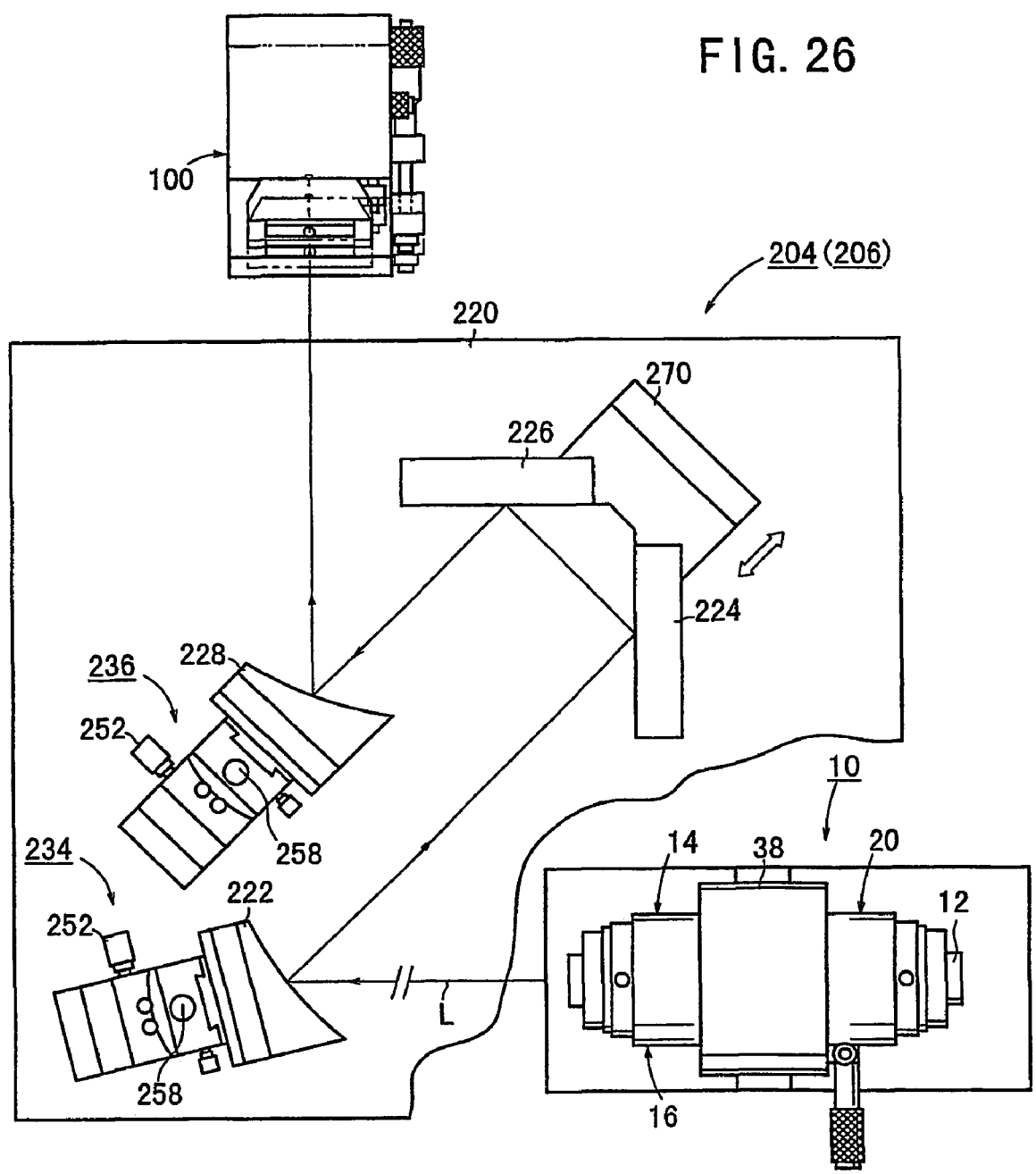
FIG. 26 is a plan view illustrative of the manner in which the focal length and focused spot diameter of the remote head are measured.

In the remote heads 204, 206, after the optical units 234, 246 are installed on the optical tabletop 220, focal lengths, focal points, and focused beam diameters near the focal points at the installed positions of the first and second plane reflecting mirrors 224, 226 are measured (see FIG. 26). At this time, the beam diameter increasing means 66 is mounted on the reference beam unit 10, and the optical axis detecting unit 100 is placed at the focal point.

Figure 27:
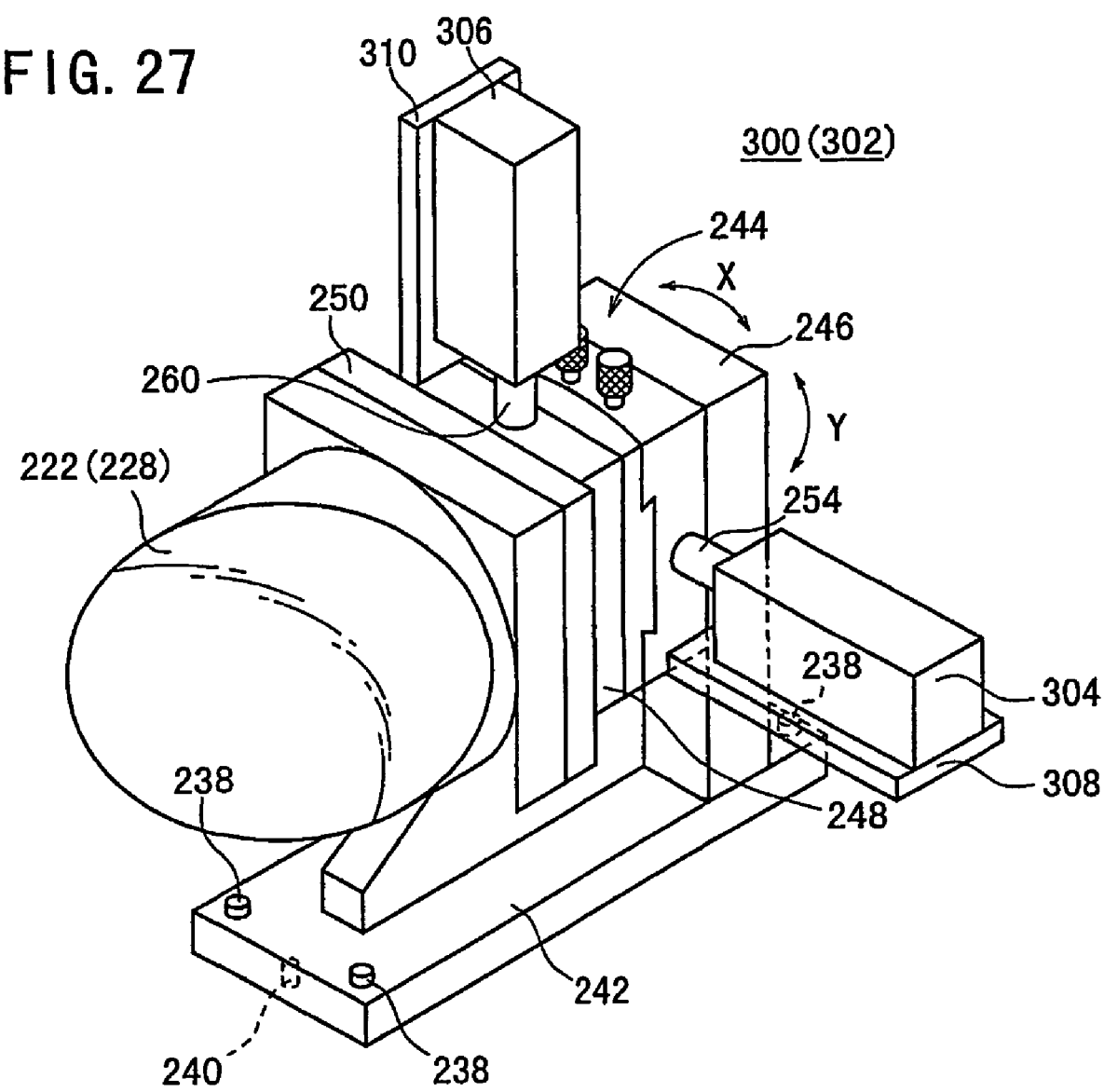
FIG. 27 is a perspective view of an optical head according to a second embodiment of the present invention.

FIG. 27 shows in perspective optical units 300, 302 according to a second embodiment of the present invention. Those parts of the optical units 300, 302 which are identical to those of the optical units 234, 236 according to the first embodiment are denoted by identical reference numerals, and will not be described in detail below.

Each of the optical units 300, 302 has first and second motors 304, 306 as first and second operating members. The first motor 304 is horizontally fixed to the support block 246 by an attachment 308, and has a rotatable shaft to which the first pinion 254 is coupled. The second motor 306 is vertically fixed to the first tilting member 248 by an attachment 310, and has a rotatable shaft to which the second pinion 260 is coupled.

In the second embodiment, when the first and second motors 304, 306 are energized, the first and second tilting members 248, 250 are automatically adjusted in angle respectively in the directions indicated by the arrow X and the directions indicated by the arrow Y. Thus, alignment adjustments of the parabolic mirror 222 and the elliptical mirror 228 are easily automatized.

Figure 28:
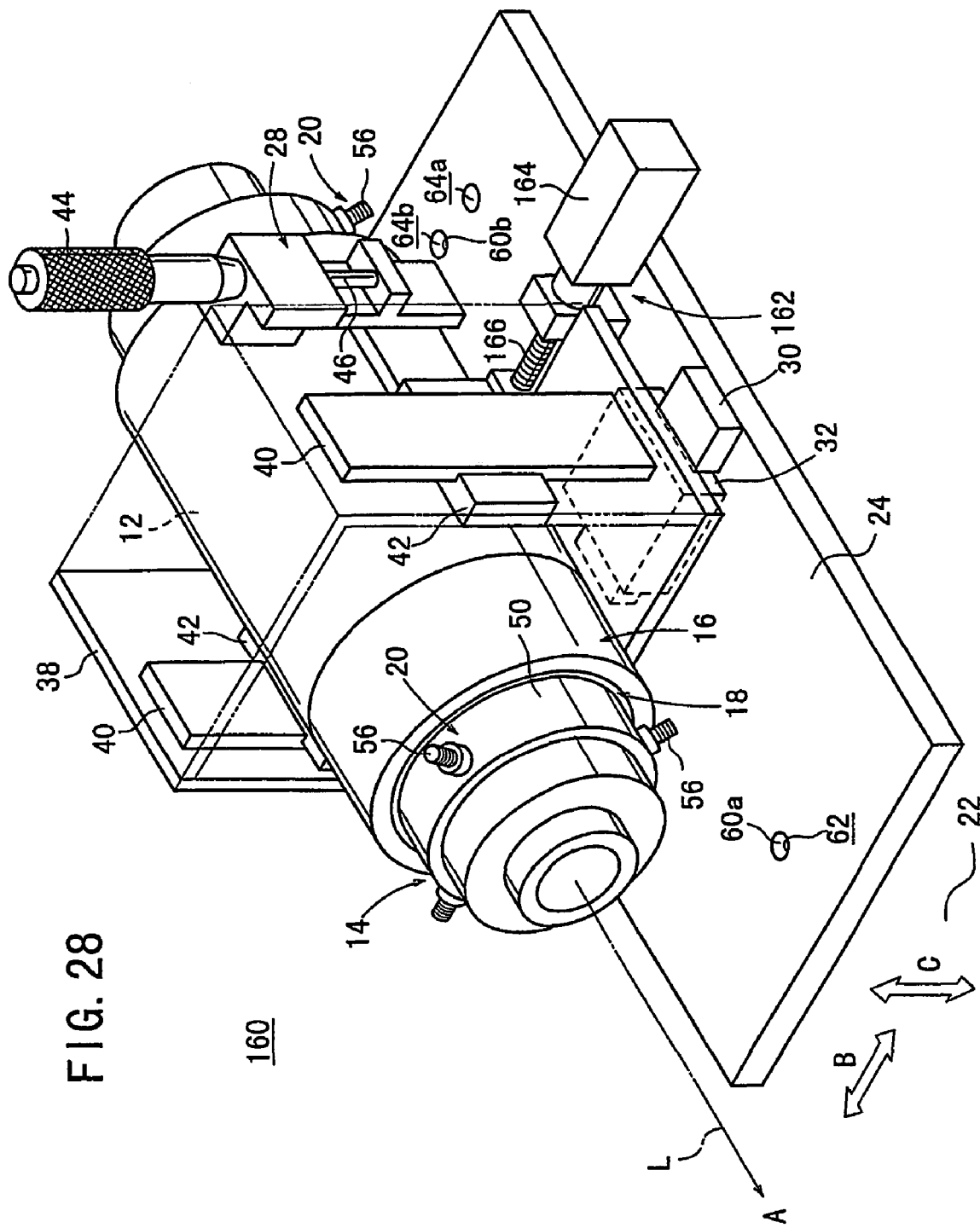
FIG. 28 is a perspective view of a reference beam unit of an apparatus for adjusting an optical component according to a second embodiment of the present invention.

FIG. 28 shows in perspective a reference beam unit 160 of an adjusting apparatus according to a second embodiment of the present invention, and FIG. 9 shows in perspective an optical axis detecting unit 170 of the adjusting apparatus.

The reference beam unit 160 has a horizontal slide mechanism 162 for automatically displacing the laser beam unit 14 in the direction indicated by the arrow B which are perpendicular to the optical axis (the directions indicated by the arrow A). The horizontal slide mechanism 162 has a rotary actuator, e.g., a motor 164, having a drive shaft coupled to a ball screw 166 held in mesh with the column 38. The vertical slide mechanism 28 may also be automatized as with the horizontal slide mechanism 162.

Figure 29:
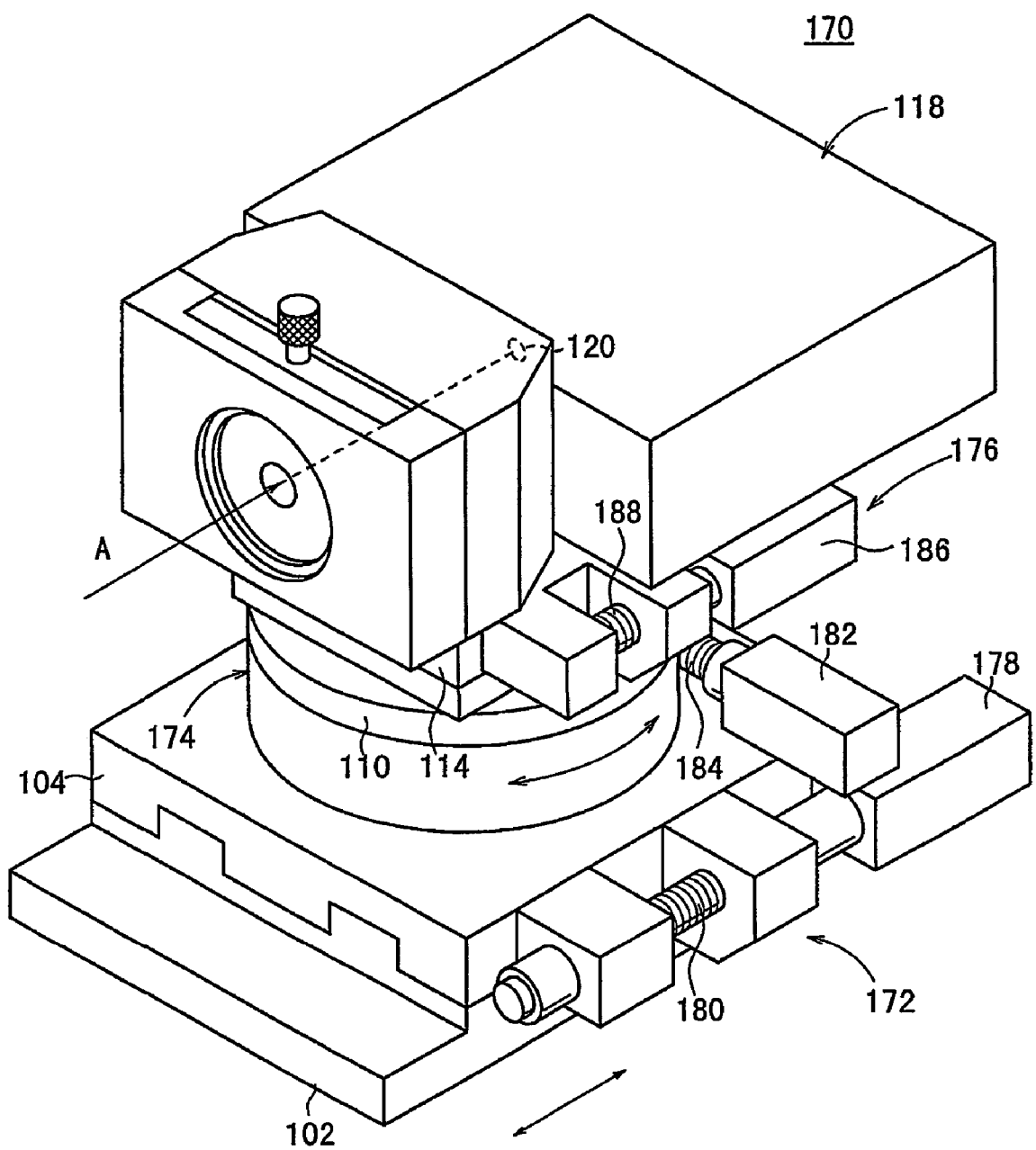
FIG. 29 is a perspective view of an optical axis detecting unit of the adjusting apparatus according to the second embodiment.

As shown in FIG. 29, the optical axis detecting unit 170 comprises a moving mechanism 172 for automatically moving the first slide base 104 along the optical axis (the directions indicated by the arrow A), a rotating mechanism 174 for automatically rotating the rotary base 110, and an inching mechanism 176 for automatically displacing the second slide base 114 on the rotary base 110 in the directions indicated by the arrow A.

The moving mechanism 172 has a first motor 178 fixedly mounted on the unit base 102 and a ball screw 180 coupled to the first motor 178 and held in threaded engagement with the first slide base 104. The rotating mechanism 174 has a second motor 182 fixedly mounted on the first slide base 104 and a ball screw 184 coupled to the second motor 182 and held in threaded engagement with the rotary base 110. The inching mechanism 176 has a third motor 186 fixedly mounted on the rotary base 110 and a ball screw 188 coupled to the third motor 186 and held in threaded engagement with the second slide base 114.

Figure 30:
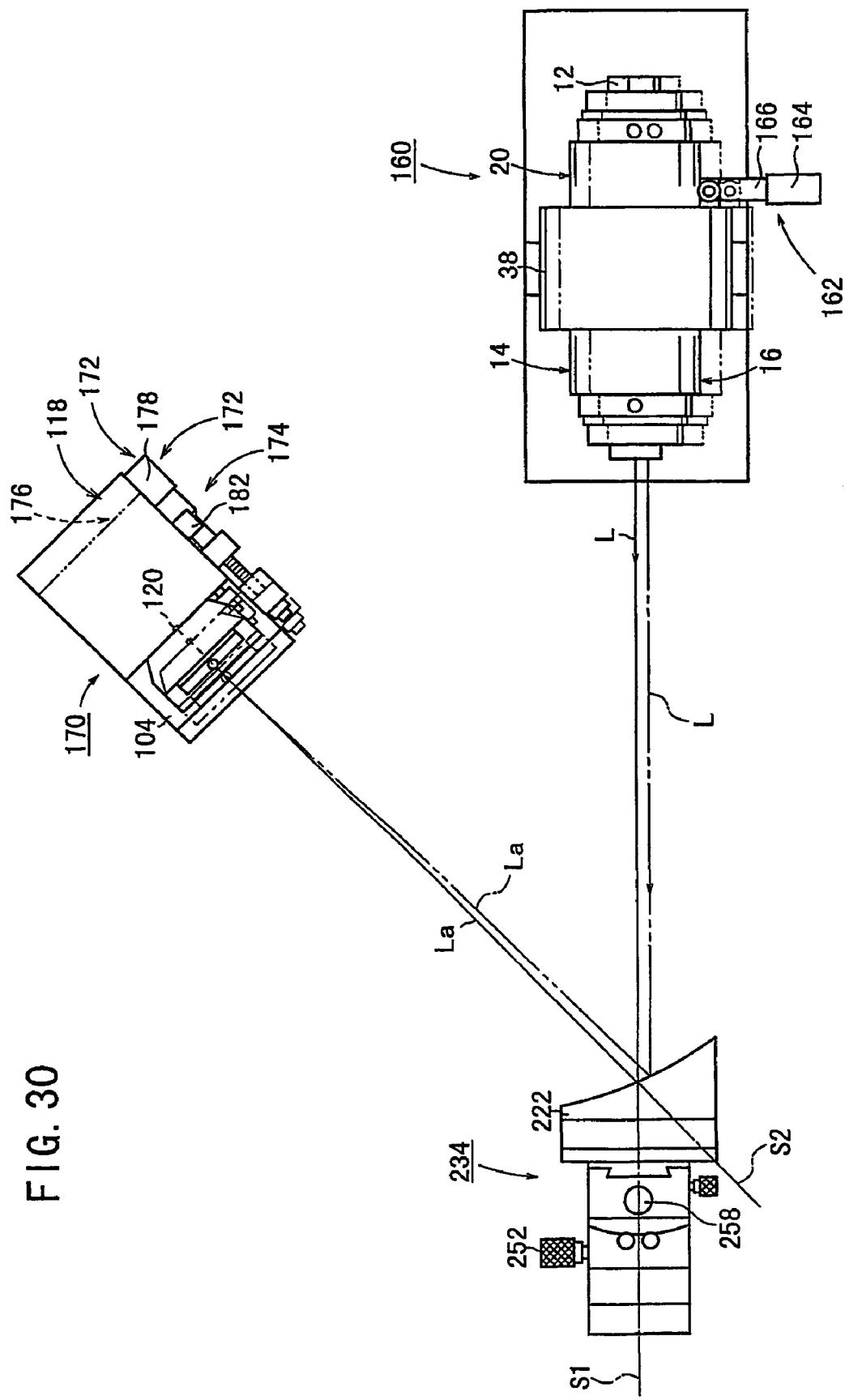
FIG. 30 is a view illustrative of the manner in which the focal point of a parabolic mirror is detected using the adjusting apparatus according to the second embodiment.

A process of automatically measuring the focal point of the parabolic mirror 222 as shown in FIG. 30 will be described below with reference to a flowchart shown in FIG. 31.

Figure 31:
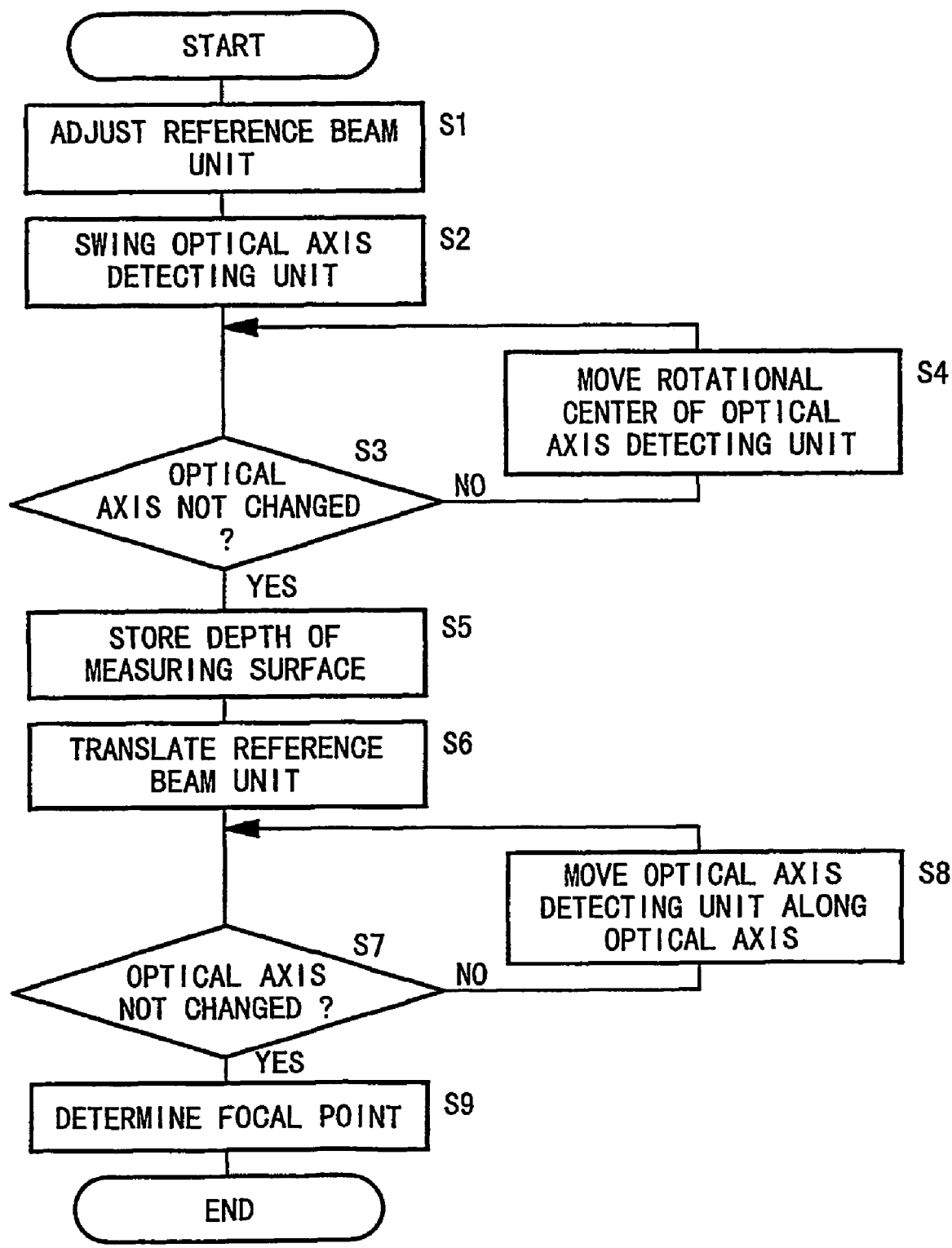
FIG. 31 is a flowchart of a process of automatically measuring the focal point of the parabolic mirror in the second embodiment.

The reference laser beam L emitted from the reference beam unit 160 is adjusted in advance in step S1 shown in FIG. 31. The reference beam unit 160 emits the reference laser beam L, and the optical axis detecting unit 170 is automatically swung about the vertical axis by the second motor 182 of the rotating mechanism 174 in step S2.

It is determined in step S3 whether the optical axis position of the reflected beam La applied to the beam dot measurement surface 120 of the optical axis detecting unit 100 varies or not. If the optical axis position varies in position, then control goes to step S4 in which the third motor 186 of the inching mechanism 176 is energized to automatically move the beam dot measurement surface 120 along the optical axis S2.

If the optical axis position does not vary, then the beam dot measurement surface 120 and the rotational axis of the rotating mechanism 174 are held in conformity with each other, thus detecting the position of the beam dot measurement surface 120. Then, control goes to step S5 in which the position of the beam dot measurement surface 120 is stored. Thereafter, the motor 164 of the horizontal slide mechanism 162 is energized to automatically translate the reference beam unit 160 in a direction perpendicular to the optical axis S1 in step S6. If the optical axis position measured by the optical axis detecting unit 170 varies in step S7 (NO), then control goes to step S8 in which the optical axis detecting unit 170 moves along the optical axis S2. If the optical axis position does not vary in step S7 (YES), then control goes to step S9 in which the stored position is determined as the focal point, and a focal length is automatically measured.

Figure 32:
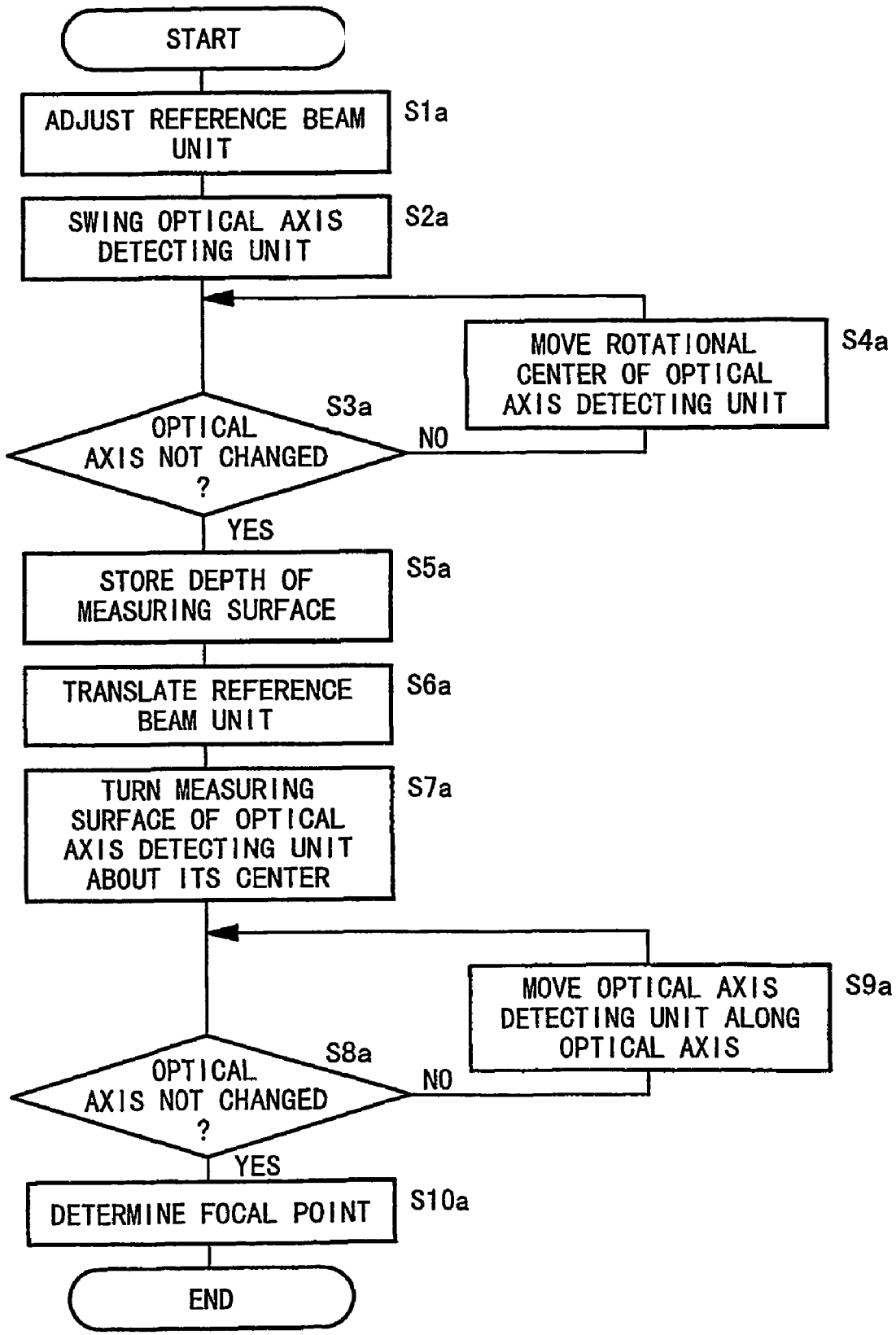
FIG. 32 is a flowchart of another process of automatically measuring the focal point of the parabolic mirror in the second embodiment.

FIG. 32 is a flowchart of another process of automatically measuring the focal point of the parabolic mirror 222. The flowchart shown in FIG. 32 is basically the same as the flowchart shown in FIG. 31, and will briefly be described below.

Steps S1a through S5a are carried out to store the position of the optical axis measurement surface for the parabolic mirror 222. Then, control goes to step S6a. In step S6a, the reference beam unit 10 is translated along the optical axis S1, and emits the reference laser beam L. In the optical axis detecting unit 170, the rotating mechanism 174 automatically turns the beam spot measurement surface 120 in step S7a, and then it is determined in step S8a whether the optical axis position of the reflected beam La applied to the beam spot measurement surface 120 varies or not.

If the optical axis position varies, then control goes to step S9a in which the optical axis detecting unit 170 is automatically moved along the optical axis S2. If the optical axis position does not vary, then control goes to step S10a in which the focal point is determined. The focal point of the parabolic mirror 222 is automatically measured accordingly.

With the method of and the apparatus for adjusting an optical component according to the present invention, the laser beam unit incorporating the laser oscillator for emitting the reference laser beam is rotatable about the optical axis with respect to the base, and the beam center adjusting mechanism is provided for bringing the optical axis of the reference laser beam into conformity with the rotational center of the reference b am unit. Therefore, the optical axis of the reference laser beam can be adjusted with high accuracy, allowing optical components to be measured highly accurately using the reference laser beam.

According to the present invention, moreover, the reference laser beam whose optical axis has been established is applied to an optical component, which applies the reflected beam to the optical axis unit and/or the optical axis detecting unit for thereby performing, with high accuracy, the process of adjusting the optical axes of various optical components.

The optical axes of reflected beams from optical components can be detected highly accurately, so that the optical axes of various optical components can be detected and adjusted highly accurately and efficiently with a simple process and structure.

According to the present invention, furthermore, the reference laser beam whose optical axis has been established is applied to an optical component, which applies the reflected beam to the optical axis detecting unit for thereby performing, with high accuracy, the process of adjusting various optical components.

Since only the reference beam unit and the optical axis detecting unit need to be used, various optical components can be adjusted highly accurately and efficiently with a simple process and structure.

According to the present invention, the reference laser beam whose optical axis has been established is applied to a non-plane mirror, which applies the r flected beam to the optical axis unit and/or the optical axis detecting unit for thereby performing, with high accuracy, the process of adjusting the optical axes and focal points of various non-plane mirrors with a simple process and structure.

With the optical unit according to the present invention, the base member is removed from the optical tabletop and alignment adjustments of the optical component are performed by the adjusting mechanism, after which the base member is simply installed back on the optical tabletop, thus performing alignment adjustments of the optical component with respect to the optical tabletop. Therefore, alignment adjustments of an optical component can be performed efficiently and accurately.

Although certain preferred embodiments of the present invention have been shown and described in detail, it should be understood that various changes and modifications may be made therein without departing from the scope of the appended claims.

The invention claimed is:

1. A method of adjusting an optical component comprising the step of adjusting an optical axis of a reference laser beam emitted from a reference beam unit before aligning said optical component by applying said reference laser beam to said optical component, said adjusting step comprising the steps of:

placing an optical axis detecting unit in a first position in the optical axis of said reference beam unit, emitting a reference laser beam from a laser oscillator incorporated in a laser beam unit of said reference beam unit, rotating said laser beam unit to detect an optical axis position of the reference laser beam through said optical axis detecting unit, thereby adjusting said laser beam unit; and placing said optical axis detecting unit in a second position different from said first position in the optical axis of the reference beam unit, emitting the reference laser beam from the laser oscillator, rotating said laser beam unit to detect an optical axis position of the reference laser beam through said optical axis detecting unit, thereby adjusting the laser beam unit.

2. A method of adjusting an optical component, comprising the steps of:

applying a reference laser beam whose optical axis has been established to the optical component and applying a reflected beam from said optical component to an optical axis unit;

passing said reflected beam through respective holes defined respectively in first and second pinhole plates which are mounted on said optical axis unit and spaced a given distance from each other to determine whether said reflected beam is detected on a measurement point or not; and adjusting said optical component at least in position or angle if the reflected beam is not detected on said measurement point.

3. A method according to claim 2, further comprising the step of:

applying said reflected beam to an optical axis detecting unit disposed in association with said measurement point, and detecting the optical axis position of said reflected beam.

4. A method of adjusting an optical component, comprising the steps of:

placing an optical axis detecting unit between a reference beam unit for emitting a reference laser beam whose optical axis has been established and the optical component, applying said reference laser beam to said optical axis detecting unit, and detecting a first optical axis position of said reference laser beam;

retracting said optical axis detecting unit from an optical path, thereafter introducing a reflected beam produced from the optical component when said reference laser beam is applied to said optical component, into said optical axis detecting unit, and detecting a second optical axis position of said reference laser beam; and positionally adjusting said optical component to align said first optical axis position and said second optical axis position with each other.

5. A method according to claim 4, further comprising the steps of:

rotating an optical axis measurement surface of said optical axis detecting unit about an axis perpendicular to the optical axis of said reference laser beam, and positioning said optical axis detecting unit in a position where the optical axis position of said reference laser beam applied to said optical axis measurement surface does not vary.

6. A method of adjusting an optical component, comprising the steps of:
introducing a reflected beam produced from the optical component when a reference laser beam whose optical axis has been established is applied to said optical component, into an optical axis detecting unit, and detecting a first optical axis position of said reference laser beam;
moving said optical axis detecting unit along the optical axis of said reference laser beam, thereafter applying said reference laser beam to said optical component, introducing a reflected beam from said optical component into said optical axis detecting unit, and detecting a second optical axis position of said reference laser beam; and
positionally adjusting said optical component to align said first optical axis position and said second optical axis position with each other.

7. A method according to claim 6, further comprising the steps of:
rotating an optical axis measurement surface of said optical axis detecting unit about an axis perpendicular to the optical axis of said reference laser beam, and positioning said optical axis detecting unit in a position where the optical axis position of said reference laser beam applied to said optical axis measurement surface does not vary.

8. A method of adjusting an optical component, comprising the steps of:
translating or tilting a reference beam unit for emitting a reference laser beam whose optical axis has been established, with respect to said optical axis, and applying said reference laser beam from said reference beam unit to a curved mirror as the optical component;
applying a reflected beam from said curved mirror to which said reference laser beam is applied, to an optical axis detecting unit; and
moving said optical axis detecting unit along the optical axis of said reference laser beam, and establishing a position where the movement of the optical axis of said reflected beam detected by said optical axis detecting unit is minimum, as the focal point of said curved mirror.

9. A method according to claim 8, further comprising the steps of:
applying said reference laser beam to the curved mirror, the curved mirror being a parabolic mirror, introducing a reflected beam from said parabolic mirror into said optical axis detecting unit, and rotating an optical axis measurement surface of said optical axis detecting unit about an axis perpendicular to the optical axis of said reference laser beam.

10. A method according to claim 8, further comprising the steps of:
applying said reference laser beam to the curved mirror, the curved mirror being a parabolic mirror, introducing a reflected beam from said parabolic mirror into said optical axis detecting unit, and rotating an optical axis measurement surface of said optical axis detecting unit about an axis perpendicular to the optical axis of said reference laser beam;
determining whether the optical axis position of said reference laser beam applied to said optical axis measurement surface varies or not;
if the optical axis position of said reference laser beam varies, moving the rotational center of said optical axis detecting unit;
if the optical axis position of said reference laser beam does not vary, translating said reference beam unit, and determining whether the optical axis position of said reference laser beam applied to said optical axis measurement surface varies or not;
if the optical axis position of said reference laser beam varies upon translation of said reference beam unit, moving said optical axis detecting unit along said optical axis; and
establishing a position of said optical axis measurement surface where the optical axis position of said reference laser beam does not vary, as the focal point of said parabolic mirror.

11. A method according to claim 8, further comprising the steps of:
applying said reference laser beam to the curved mirror, the curved mirror being a parabolic mirror, introducing a reflected beam from said parabolic mirror into said optical axis detecting unit, and rotating an optical axis measurement surface of said optical axis detecting unit about an axis perpendicular to the optical axis of said reference laser beam;
determining whether the optical axis position of said reference laser beam applied to said optical axis measurement surface varies or not;
if the optical axis position of said reference laser beam varies, moving the rotational center of said optical axis detecting unit;
if the optical axis position of said reference laser beam does not vary, translating said reference beam unit, rotating said optical axis measurement surface about an axis perpendicular to the optical axis of said reference laser beam, and determining whether the optical axis position of said reference laser beam applied to said optical axis measurement surface varies or not;
if the optical axis position of said reference laser beam varies upon translation of said reference beam unit and rotation of said optical axis measurement surface, moving said optical axis detecting unit along said optical axis; and
establishing a position of said optical axis measurement surface where the optical axis position of said reference laser beam does not vary, as the focal point of said parabolic mirror.

12. A method of adjusting an optical component, comprising the steps of:
preparing a reference beam unit for emitting a reference laser beam whose optical axis has been established as a collimated beam, and applying said collimated beam from said reference beam unit to a curved mirror as the optical component;
applying a reflected beam from said curved mirror to which said reference laser beam is applied, to an optical axis detecting unit; and
moving said optical axis detecting unit along the optical axis of said reference laser beam, and establishing a position where the movement of the optical axis of said reflected beam detected by said optical axis detecting unit is minimum, as the focal point of said curved mirror.

13. A method according to claim 12, further comprising the steps of:
applying said reference laser beam to said optical axis detecting unit;
aligning an optical axis measurement surface of said optical axis detecting unit with the rotational axis of said optical axis detecting unit; and
moving said optical axis measurement surface along the optical axis of said reference laser beam to adjust a measuring position on said optical axis measurement surface.

14. A method of adjusting an optical component, comprising the steps of:
aligning the optical axis of a reference laser beam emitted from a laser beam unit incorporating a laser oscillator with the rotational center of a reference beam unit incorporating said laser beam unit;
adjusting the optical axis position of said reference laser beam;
applying said reference laser beam whose optical axis has been established to a curved mirror as the optical component, and measuring a reflected beam from said curved mirror to detect the optical axis and focal point of said curved mirror; and
adjusting at least the position or angle of said curved mirror based on the detected optical axis and focal point of said curved mirror.

15. A method according to claim 14, further comprising the steps of:
passing said reference laser beam or said reflected beam through respective holes defined respectively in first and second pinhole plates which are spaced a given distance from each other to determine whether said reflected beam is detected on a measurement point or not; and
if said reference laser beam or said reflected beam is not detected on the measurement point, adjusting at least the position or angle of said laser beam unit.

16. A method according to claim 14, further comprising the steps of:
passing said reference laser beam or said reflected beam through respective holes defined respectively in first and second pinhole plates which are spaced a given distance from each other, to determine whether said reflected beam is detected on a measurement point or not; and
if said reference laser beam or said reflected beam is not detected on the measurement point, adjusting at least the position or angle of said curved mirror.

17. A method according to claim 14, further comprising the steps of:
applying said reference laser beam or said reflected beam to an optical axis detecting unit, and detecting the optical axis position of said reference laser beam or said reflected beam.

18. An apparatus for adjusting an optical component by applying a reference laser beam emitted from a reference beam unit to said optical component, comprising:
a reference beam unit for applying a reference laser beam to the optical component;
said reference beam unit comprising:
a laser beam unit incorporating a laser oscillator for emitting said reference laser beam;
a rotating mechanism for rotating said laser beam unit about the optical axis thereof with respect to a base; and
a beam center adjusting mechanism for aligning the optical axis of said reference laser beam emitted from said laser beam unit with the rotational center of said reference beam unit.

19. An apparatus according to claim 18, further comprising:
slide mechanism for moving said reference beam unit vertically or horizontally in a direction perpendicular to at least said optical axis.

20. An apparatus according to claim 18, further comprising:
a tilting mechanism for tilting and fixing said reference beam unit in a direction perpendicular to said optical axis.

21. An apparatus according to claim 18, further comprising:
an optical axis unit for adjusting the optical axis of said reference beam unit;
said optical axis unit having first and second pinhole plates having respective holes defined therein and spaced a given distance from each other.

22. An apparatus according to claim 18, further comprising:
an optical axis detecting unit for detecting the optical axis position of said reference laser beam applied from said reference beam unit.

23. An apparatus according to claim 18, wherein said laser beam unit has detachable beam diameter increasing means for increasing the beam diameter of said reference laser beam.

24. An apparatus for adjusting an optical component of a laser optical instrument, comprising:
a reference beam unit for emitting a reference laser beam whose optical axis has been established;
an optical axis unit for detecting the optical axis of the optical component by applying said reference laser beam to said optical component to obtain a reflected beam used therefor;
said optical axis unit comprising:
first and second pinhole plates having respective small holes defined therein and spaced a given distance from each other; and
a small hole position adjusting mechanism for positionally adjusting said first and second pinhole plates in a direction perpendicular to said optical axis.

25. An apparatus according to claim 24, further comprising:
an optical axis detecting unit for detecting the optical axis position of said reference laser beam which has passed through said first and second pinhole plates.

26. An apparatus for adjusting an optical component of a laser optical instrument, comprising;
a reference beam unit for emitting a reference laser beam whose optical axis has been established;
an optical axis detecting unit for detecting the optical axis position of said optical component with said reference laser beam; and
a rotating mechanism for rotating an optical axis measurement surface of said optical axis detecting unit about an axis perpendicular to the optical axis of said reference laser beam.

27. An apparatus according to claim 26, further comprising:
a moving mechanism for moving said optical axis detecting unit along the optical axis of said reference laser beam.

28. An apparatus for adjusting an optical component of a laser optical instrument, comprising:

a reference beam unit for emitting a reference laser beam whose optical axis has been established; and an optical axis detecting unit for detecting the optical axis position of a reflected beam from the optical component to which said reference laser beam is applied;

said optical axis detecting unit having a moving mechanism for moving the said optical axis detecting unit along the optical axis of said reference laser beam.

29. An apparatus according to claim 28, wherein said optical axis detecting unit comprises:

an optical axis measurement surface for detecting the optical axis position of said reflected beam;

a rotating mechanism for rotating said optical axis measurement surface about an axis perpendicular to the optical axis of said reference laser beam; and a measurement position adjusting mechanism for moving said optical axis measurement surface along the optical axis of said reference laser beam.

30. An apparatus according to claim 28, wherein said reference beam unit has beam diameter increasing means for increasing the beam diameter of said reference laser beam in order to emit said reference laser beam as a collimated beam.

31. An apparatus for adjusting an optical component of a laser optical instrument, comprising:

a reference beam unit for emitting a reference laser beam, said reference beam unit being capable of establishing the optical axis of said reference laser beam; and at least an optical axis unit or an optical axis detecting unit for adjusting the optical axis of said reference laser beam and detecting the optical axis and focal point of a reflected beam from a curved mirror as the optical component to which said reference laser beam is applied.

32. An apparatus according to claim 31, wherein said optical axis unit comprises:

first and second pinhole plates having respective small holes defined therein and spaced a given distance from each other; and a small hole position adjusting mechanism for positionally adjusting said first and second pinhole plates in a direction perpendicular to said optical axis.

33. An apparatus according to claim 31, wherein said optical axis detecting unit comprises:

a rotating mechanism for rotating an optical axis measurement surface of said optical axis detecting unit about an axis perpendicular to the optical axes of said reference laser beam and said reflected beam;

a measurement position adjusting mechanism for moving said optical axis measurement surface along the rotational axis of said rotating mechanism; and a moving mechanism for moving said optical axis detecting unit along the optical axes of said reference laser beam and said reflected beam.

* * * * *